United States Patent
Tao et al.

(10) Patent No.: US 12,389,359 B2
(45) Date of Patent: Aug. 12, 2025

(54) TRACKING AREA CODE TRANSMISSION IN NON-TERRESTRIAL NETWORKS

(71) Applicant: Panasonic Intellectual Property Corporation of America, Torrance, CA (US)

(72) Inventors: Ming-Hung Tao, Frankfurt am Main (DE); Hidetoshi Suzuki, Kanagawa (JP); Rikin Shah, Langen (DE); Akihiko Nishio, Osaka (JP); Quan Kuang, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 336 days.

(21) Appl. No.: 18/004,653

(22) PCT Filed: Jul. 6, 2021

(86) PCT No.: PCT/EP2021/068573
§ 371 (c)(1),
(2) Date: Jan. 6, 2023

(87) PCT Pub. No.: WO2022/008473
PCT Pub. Date: Jan. 13, 2022

(65) Prior Publication Data
US 2023/0254801 A1    Aug. 10, 2023

(30) Foreign Application Priority Data
Jul. 10, 2020   (EP) .................................... 20185280

(51) Int. Cl.
*H04W 60/04*   (2009.01)
*H04W 68/02*   (2009.01)
*H04W 84/04*   (2009.01)

(52) U.S. Cl.
CPC ........... *H04W 60/04* (2013.01); *H04W 68/02* (2013.01); *H04W 84/042* (2013.01)

(58) Field of Classification Search
CPC ... H04W 60/04; H04W 68/02; H04W 84/042; H04W 48/12; H04W 84/06
See application file for complete search history.

(56) References Cited

U.S. PATENT DOCUMENTS

2015/0173080 A1   6/2015   Kimura et al.
2016/0128020 A1   5/2016   Agarwal et al.
(Continued)

FOREIGN PATENT DOCUMENTS

CN    107241694 A   10/2017
CN    110012435 A   7/2019
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.6.0, Jun. 2019. (133 pages).

(Continued)

*Primary Examiner* — Ashley Shivers
(74) *Attorney, Agent, or Firm* — Seed IP Law Group LLP

(57) ABSTRACT

The present disclosure provides a base station, comprising a transceiver; and circuitry which, in operation, controls the transceiver to serve a cell associated with a first tracking area code, TAC, periodically transmit, in system information, a TAC indicator indicating at least one TAC associated with the cell, and transmit a trigger indicator for triggering a transceiver device to perform a system information update procedure when a content of the system information changes, wherein the circuitry, in operation, prevents the (Continued)

transceiver from transmitting the trigger indicator in a case where the cell is being associated with a second TAC due to a movement of the cell.

17 Claims, 13 Drawing Sheets

(56) References Cited

U.S. PATENT DOCUMENTS

2022/0078746 A1* 3/2022 Lee ............... H04W 64/003
2022/0400466 A1* 12/2022 Sha ............... H04W 68/02

FOREIGN PATENT DOCUMENTS

CN          111246393 A     6/2020
WO      2019194718 A1    10/2019

OTHER PUBLICATIONS

3GPP, "3rd Generation Partnership Project; Technical Specification Group Radio Access Network; NR; Multiplexing and channel coding (Release 15)," 3GPP TS 38.212 V15.6.0, Jun. 2019. (101 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3Gpp, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical layer procedures for control (Release 15)," 3GPP TS 38.213 V15.6.0, Jun. 2019. (107 pages).

3GPP, "3rd Generation Partnership Project; Technical Specification Group Radio Access Network; NR; Radio Resource Control (RRC) protocol specification (Release 15)," 3GPP TS 38.331 V15.6.0, Jun. 2019. (519 pages).

3GPP, "3rd Generation Partnership Project; Technical Specification Group Radio Access Network; NR; User Equipment (UE) procedures in Idle mode and RRC Inactive state (Release 15)," 3GPP TS 38.304 V15.3.0, Mar. 2019. (29 pages).

3GPP, "3rd Generation Partnership Project; Technical Specification Group Radio Access Network; NR; User Equipment (UE) procedures in Idle mode and RRC Inactive state (Release 15)," 3GPP TS 38.304 V15.4.0, Jun. 2019, 29 pages.

3GPP, "3rd Generation Partnership Project; Technical Specification Group Radio Access Network; NR; User Equipment (UE) procedures in Idle mode and RRC Inactive state (Release 16)," 3GPP TS 38.304 V16.0.0, Mar. 2020. (38 pages).

3GPP, "3rd Generation Partnership Project; Technical Specification Group Radio Access Network; Solutions for NR to support non-terrestrial networks (NTN) (Release 16)," 3GPP TR 38.821 V0.3.0, Nov. 2018. (35 pages).

3GPP, "3rd Generation Partnership Project; Technical Specification Group Radio Access Network; Solutions for NR to support non-terrestrial networks (NTN) (Release 16)," 3GPP TR 38.821 V16.0.0, Dec. 2019. (140 pages).

3GPP, "3rd Generation Partnership Project; Technical Specification Group Radio Access Network; Study on New Radio (NR) to support non terrestrial networks (Release 15)," 3GPP TR 38.811 V15.0.0, Jun. 2018. (119 pages).

3GPP, "3rd Generation Partnership Project; Technical Specification Group Radio Access Network; Study on new radio access technology: Radio access architecture and interfaces (Release 14)," 3GPP TR 38.801 V14.0.0, Mar. 2017. (91 pages).

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

3GPP, "3rd Generation Partnership Project; Technical Specification Group Services and System Aspects; Study on architecture aspects for using satellite access in 5G (Release 17)," 3GPP TR 23.737 V17.0.0, Dec. 2019. (82 pages).

3GPP, "3rd Generation Partnership Project; Technical Specification Group Services and System Aspects; Study on architecture aspects for using satellite access in 5G (Release 17)," 3GPP TR 23.737 V17.1.0, Jul. 2020. (92 Pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

ETRI, "Earth fixed tracking area for the moving beams," R2-1907944, Agenda Item: 11.6.4.2, 3GPP TSG-RAN WG2 Meeting #106, Reno, USA, May 13-17, 2019. (2 pages).

Extended European Search Report, mailed Jan. 15, 2021, for European Patent Application No. 20185280.3. (17 pages).

Huawei, HiSilicon, "Considerations on TA management mechanism in LEO NTN," R2-1910572, Agenda Item: 11.6.4.2, 3GPP TSG-RAN WG2 Meeting #107, Prague, Czech Republic, Aug. 26-30, 2019. (3 pages).

International Search Report, mailed Aug. 6, 2021, for International Application No. PCT/EP2021/068573. (4 pages).

Nokia, Nokia Shanghai Bell, Thales, "Analysis on Tracking Area design," R3-193191, Agenda Item: 20.2.4.2, 3GPP TSG-WG3 Meeting #104, Reno, NV, USA, May 13-17, 2019. (5 pages).

Chinese Office Action, dated Apr. 27, 2025, for Chinese Patent Application No. 202180049735.1. (16 pages) (With English Translation).

ETRI, "Earth fixed tracking area for the moving beams," R2-1907944, Agenda Item: 11.6.4.2, 3GPP TSG-RAN WG2 Meeting #106, Reno, USA, May 13-17, 2019. (2 page).

* cited by examiner

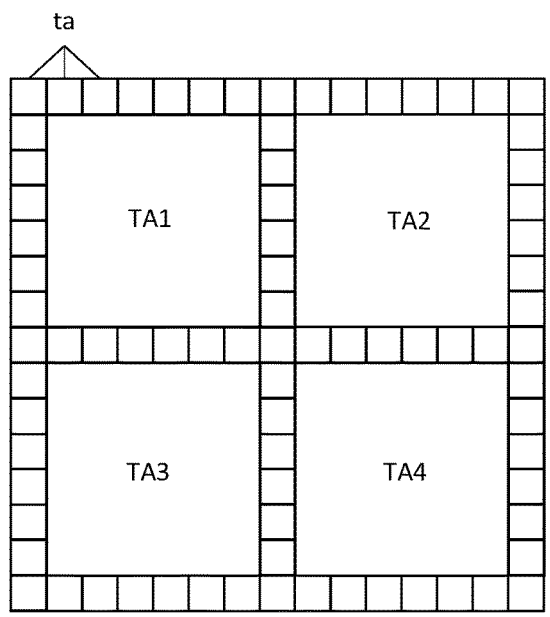 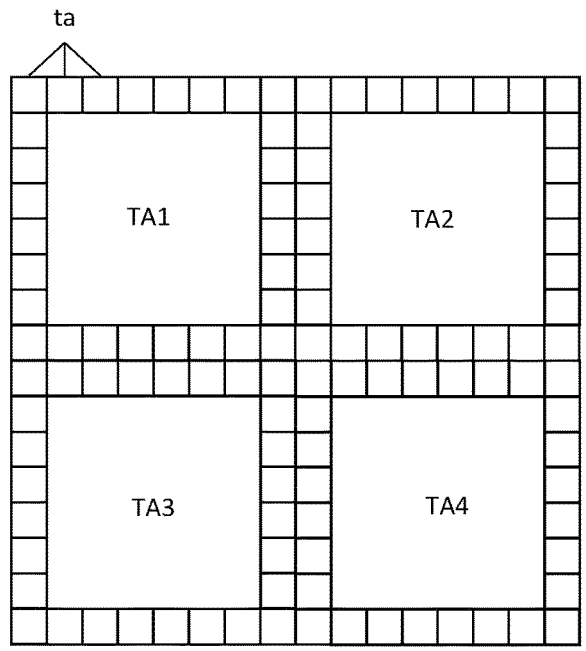
Fig. 17A    Fig. 17B
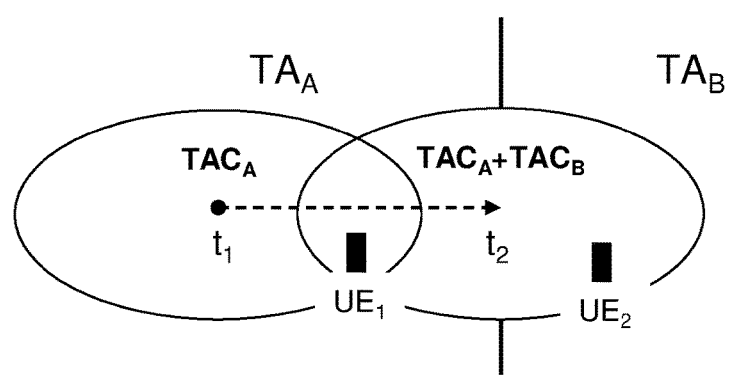
Fig. 18

TRACKING AREA CODE TRANSMISSION IN NON-TERRESTRIAL NETWORKS

FIELD OF THE PRESENT DISCLOSURE

The present disclosure relates to transmission and reception of signals in a communication system, such as a 3GPP communication system. In particular, the present disclosure relates to methods and apparatuses for such transmission and reception.

TECHNICAL BACKGROUND

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

SUMMARY

One non-limiting and exemplary embodiment facilitates providing improved procedures for facilitating to save UE power and/or reduce signaling overhead in a wireless communication network.

In an embodiment, the techniques disclosed herein feature a base station, comprising a transceiver; and circuitry which, in operation, controls the transceiver to serve a cell associated with a first tracking area code, TAC, to periodically transmit, in system information, a TAC indicator indicating at least one TAC associated with the cell, and to transmit a trigger indicator for triggering a transceiver device to perform a system information update procedure when a content of the system information changes, wherein the circuitry, in operation, prevents the transceiver from transmitting the trigger indicator in a case where the cell is being associated with a second TAC due to a movement of the cell.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

In the following, exemplary embodiments are described in more detail with reference to the attached figures and drawings.

FIG. 17A illustrates an examples of geographical structure of a plurality of tracking areas;

FIG. 17B illustrates a further example of a geographical structure of a plurality of tracking areas;

FIG. 18 illustrates a situation of a moving cell crossing a boundary of two TAs according to an embodiment applying the soft-switch option;

DETAILED DESCRIPTION

5G NR System Architecture and Protocol Stacks

3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
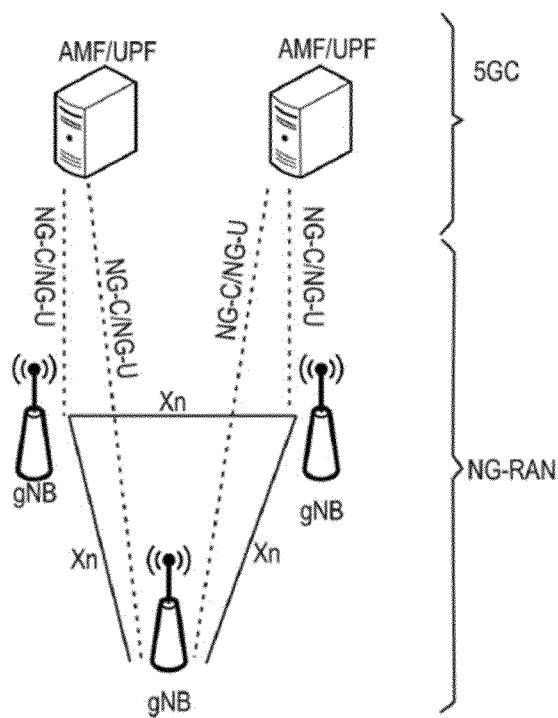
FIG. 1 shows an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Figure 2:
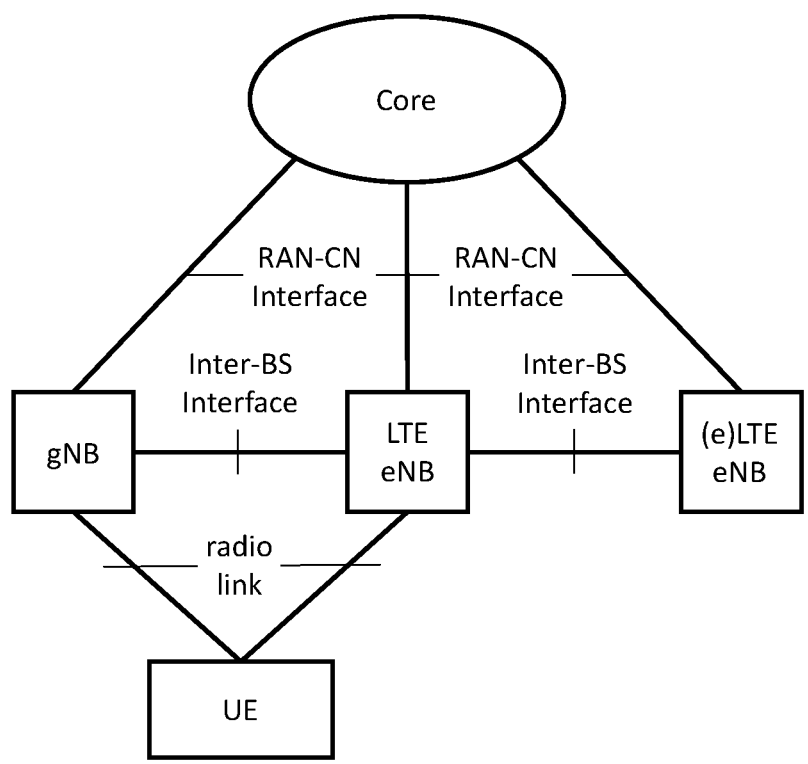
FIG. 2 shows an exemplary user and control plane architecture for the LTE eNB, gNB, and UE.

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 3:
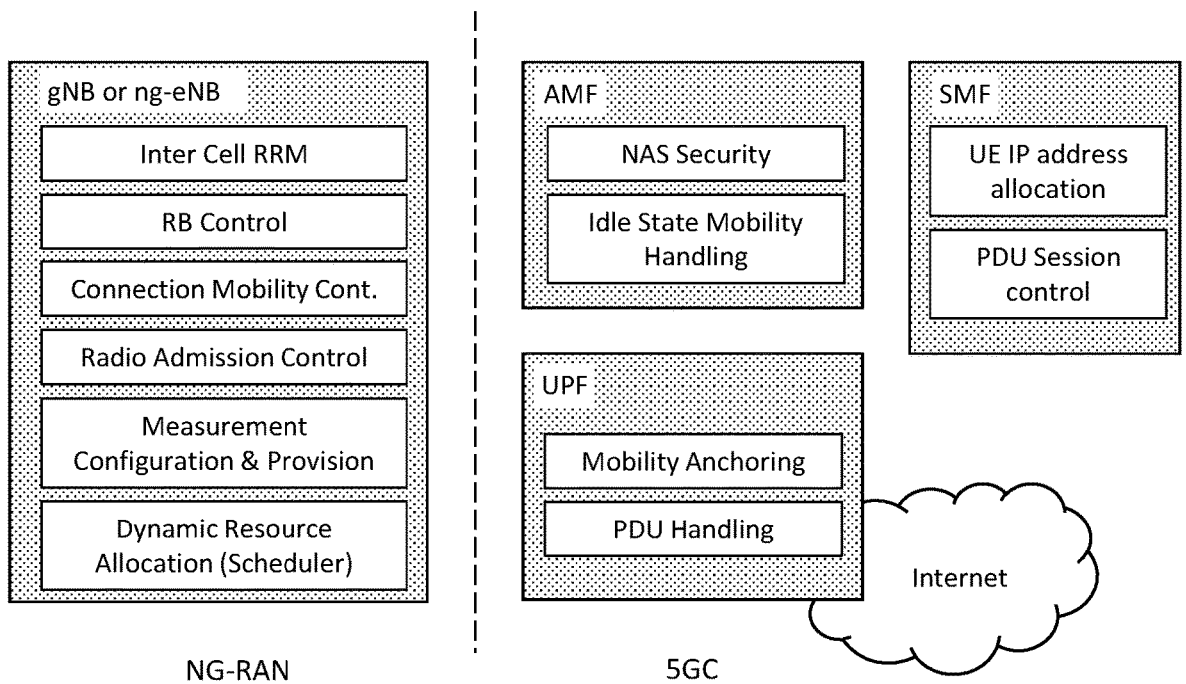
FIG. 3 is a schematic drawing which shows functional split between NG-RAN and 5GC.

FIG. 3 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);
Routing of Control Plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) hosts the following main functions:
Non-Access Stratum, NAS, signalling termination;
NAS signalling security;
Access Stratum, AS, Security control;
Inter Core Network, CN, node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
Session Management Function, SMF, selection.

Furthermore, the User Plane Function, UPF, hosts the following main functions:
Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g., packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:
Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 4:
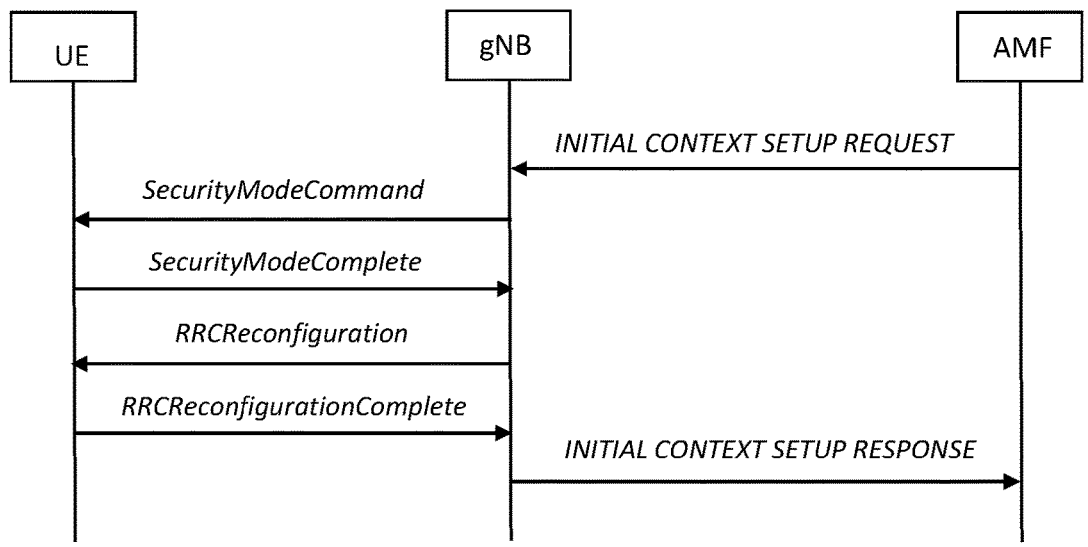
FIG. 4 is a sequence diagram for RRC connection setup/reconfiguration procedures.

FIG. 4 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
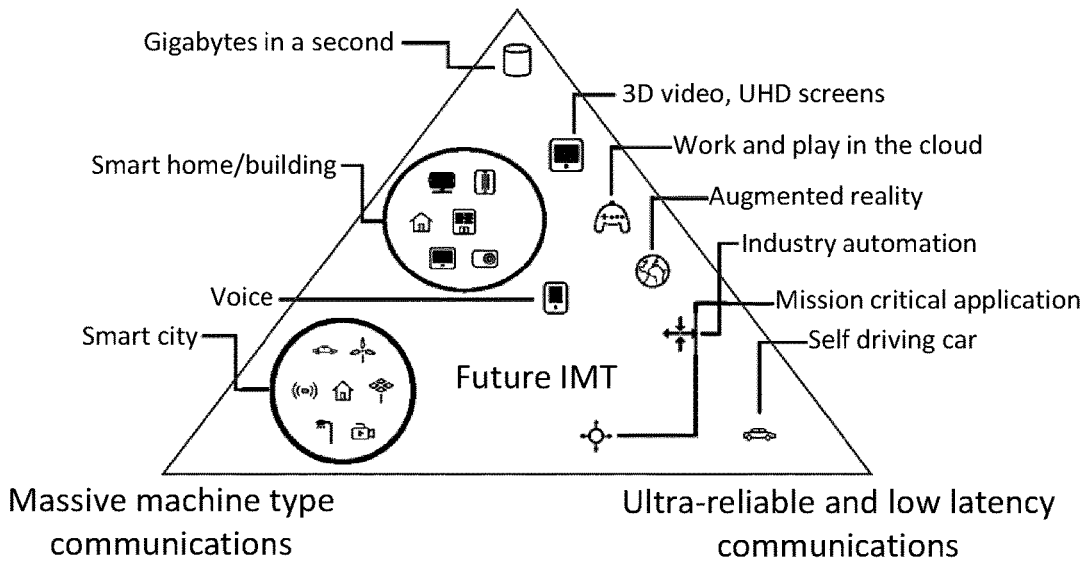
FIG. 5 is a schematic drawing showing usage scenarios of enhanced Mobile Broadband (eMBB), Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From RANI perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLCC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
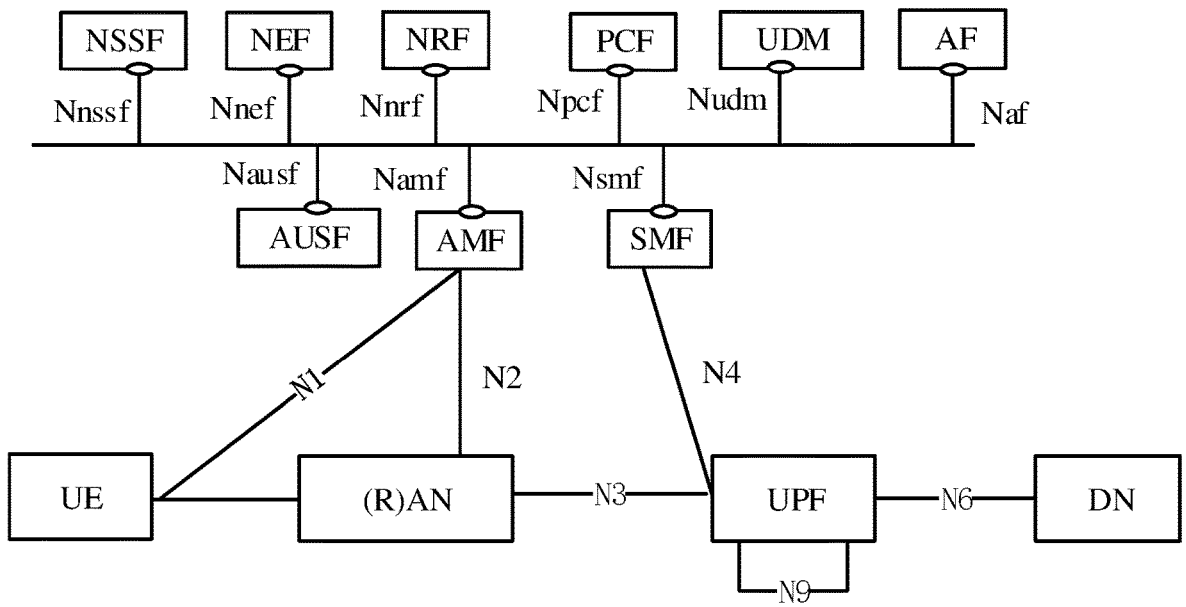
FIG. 6 is a block diagram which shows an exemplary 5G system architecture for a non-roaming scenario.

FIG. 6 illustrates a 5G NR non-roaming reference architecture (see TS 23.501 v16.1.0, section 4.23). An Application Function (AF), e.g., an external application server hosting 5G services exemplary described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

Downlink Control Channel Monitoring, PDCCH, DCI

Many of the functions operated by the UE involve the monitoring of a downlink control channel (e.g., the PDCCH, see 3GP TS 38.300 v15.6.0, section 5.2.3) to receive, e.g., particular control information or data destined to the UE.

A non-exhaustive list of these functions is given in the following:
  a paging message monitoring function,
  a system information acquisition function,
  signaling monitoring operation for a Discontinued Reception, DRX, function,
  inactivity monitoring operation for a Discontinued Reception, DRX, function,
  random access response reception for a random access function,
  reordering function of a Packet Data Convergence Protocol, PDCP, layer.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1).

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power. Correspondingly, a timer may be started when the UE starts the PDCCH monitoring for the intended purpose. Then, when the timer expires, the UE may stop the PDCCH monitoring for the intended purpose, and has the opportunity to save power.

Paging Procedures in 5G NR

An exemplary implementation of the paging function in 5G NR that involves PDCCH monitoring, according to the currently standardized version, will be explained in a simplified and abbreviated form in the following.

There are two different paging procedures in 5G NR, a RAN-based paging procedure (e.g., based on RAN-based notification areas) and a core-network-based paging procedure (see for instance 3GPP TS 38.300 v15.6.0, TS 38.304 v15.4.0, and TS 38.331 v15.6.0 referring to RAN paging and CN paging in several sections thereof, such as section 9.2.5 "Paging" in TS 38.300).

Paging allows the network to reach UEs in RRC_IDLE and RRC_INACTIVE state through Paging messages, and to notify UEs in RRC_IDLE, RRC_INACTIVE, and RRC_CONNECTED state of system information change and public warning information (such as ETWS/CMAS, Earthquake and Tsunami Warning System/Commercial Mobile Alert System) indications through Short Messages. Both the paging messages and the Short Messages are addressed with P-RNTI on the PDCCH to be monitored by the UE. But while the actual paging messages (e.g., with the paging records) are then sent on PCCH (as indicated by the PDCCH), the Short Messages can be sent over PDCCH directly.

While in RRC_IDLE the UE monitors the paging channels for CN-initiated paging, in RRC_INACTIVE the UE also monitors paging channels for RAN-initiated paging. A UE need not monitor paging channels continuously though; Paging DRX is defined where the UE in RRC_IDLE or RRC_INACTIVE is only required to monitor paging channels during one Paging Occasion (PO) per DRX cycle (see 3GPP TS 38.304 v15.3.0, e.g., sections 6.1 and 7.1). The Paging DRX cycles are configured by the network.

The POs of a UE for CN-initiated and RAN-initiated paging are based on the same UE ID, resulting in overlapping POs for both. The number of different POs in a DRX cycle is configurable via system information, and a network may distribute UEs to those POs based on their IDs. A PO is a set of PDCCH monitoring occasions and can consist of multiple time slots (e.g., subframe or OFDM symbol) where paging DCI can be sent. One Paging Frame (PF) is one Radio Frame and may contain one or multiple PO(s) or starting point of a PO.

When in RRC_CONNECTED, the UE monitors the paging channels in any PO signaled in system information for a System Information (SI) change indication and/or a PWS (Public Warning System) notification. In case of Bandwidth Adaptation (BA) (see section 6.10 in TS 38.300), a UE in RRC_CONNECTED only monitors paging channels on the active BWP with common search space configured.

When the UE receives a paging message, the PDCCH monitoring can be stopped by the UE. Depending on the paging cause, the UE may continue with, e.g., obtaining system information, or establishing the RRC connection with the base station and then receiving the traffic/instruction from the network.

Tracking Area and Tracking Area Code

Since the location of a UE is typically known on a cell level, a paging message is typically transmitted across multiple cells in the so-called tracking area (TA), which may be controlled by the AMF/MME (Mobility Management Entity).

A group of neighboring gNBs may be defined as a TA. This definition may be performed, for instance, at an initial deployment of a network, wherein each gNB may be configured with its own TA. A tracking area code (TAC) is a unique code that is assigned to each of the TAs.

As the network has to have updated location information about UEs in RRC_IDLE to find out in which TA a particular UE is located, the UE may notify the network of its current location by sending a tracking area update (TAU) message every time it moves between TAs.

For this purpose, when a UE attaches to a network, a list indicating TAs where the network believes the UE is located is obtained. When moving within the TAs indicated by said list, a TAU procedure is not required to be performed. However, when the UE moves to within a TA not indicated by said list, a TAU procedure is initiated.

Further, a UE in RRC_IDLE may send TAU messages on a regular basis in a periodic manner, even when the UE stays within the same TA. By providing TAU messages regularly, the network may be informed that the UE is still available and may receive data.

The tracking area code associated with a cell may be broadcasted by a respective gNB in system information, as described further below.

NR System Information Acquisition

An exemplary implementation of the system information acquisition function in 5G NR that involves PDCCH monitoring, already mentioned briefly above, according to the currently standardized version, will be explained in a simplified and abbreviated form in the following.

In 5G NR, system information (SI) is divided into the MIB (Master Information Block) and a number of SIBs (System Information Blocks) (see 3GPP TS 38.331 v15.6.0, e.g., section 5.2, see also 3GPP TS 38.300 v15.6.0, e.g., section 7.3, and also 3GPP TS 38.213 v15.6.0, e.g., section 13). The MIB is transmitted on the BCH and includes parameters that are needed to acquire the SIB1 from the cell. The SIB1 is periodically transmitted on the DL-SCH and includes information regarding the availability and scheduling, e.g., mapping of SIBs to SI messages, periodicity, SI-window size of other SIBs with an indication whether one or more SIBs are only provided on demand, and in that case, the configuration needed by the UE to perform the SI request.

SIBs other than SIB1 are carried in System Information messages (SI messages), which are transmitted on the DL-SCH. SIBs having the same periodicity can be mapped to the same SI message. Each SI message is transmitted within periodically occurring time-domain windows (referred to as SI-windows with the same length for all SI messages). Each SI message is associated with an SI-window, and the SI-windows of different SI messages do not overlap.

The UE applies the SI acquisition procedure to acquire the information of the Access Stratum (AS) and Non-Access stratum (NAS), and applies to UEs in RRC_IDLE, in RRC_INACTIVE, and in RRC_CONNECTED modes. For instance, the UE may apply the SI acquisition procedure upon cell selection (e.g., upon power-on), cell-reselection, return from out of coverage, after reconfiguration with sync completion, after entering the network from another RAT (Radio Access Technology), upon receiving an indication that the system information has changed (SI change indication), and when the UE does not have a valid version of a stored SIB. A modification period is used, i.e., updated SI is broadcast in the modification period following the one where the SI change indication is transmitted. The modification period can be defined by multiplying the default paging cycle (e.g., 230/640/1280/2560 ms) with a corresponding coefficient (modificationPeriodCoeff: 2/4/8/16), modification period=defaultPagingCycle×modificationPeriodCoeff.

The UE receives indications about the SI modifications using a Short Message transmitted with the P-RNTI over DCI, e.g., as defined in TS 38.331:

TABLE 6.5-1

Short Messages

Bit Short Message 1 systemInfoModification
   If set to 1: indication of a BCCH modification other than SIB6, SIB7 and SIB8.
2 etwsAndCmasIndication
   If set to 1: indication of an ETWS primary notification and/or an ETWS secondary notification and/or a CMAS notification.
3-8 Not used in this release of the specification, and shall be ignored by UE if received.

UEs in RRC_IDLE or in RRC_INACTIVE may monitor for an SI change indication in its own paging occasion every DRX cycle (see TS 38.331 section 5.2.2.2.2). UEs in RRC_CONNECTED shall monitor for an SI change indication in any paging occasion at least once per modification period if the UE is provided with common search space on the active BWP to monitor paging.

For SI message acquisition one or more PDCCH monitoring occasions are determined, which can be the same or different than for PDCCH monitoring of SIB1. For instance, the UE assumes that, in the SI window, PDCCH for an SI message is transmitted in at least one PDCCH monitoring occasion corresponding to each transmitted SSB (Synchronization Signal Block). The SIB1 configuration provides information about the search space and other PDCCH-related parameters that a UE needs in order to monitor for scheduling of the SIB1. In particular, SIB1 may include an indicator indicating a tracking area code associated with the cell.

Discontinued Reception, DRX, in LTE and 5G NR

An exemplary implementation of the discontinued reception (DRX) function in 5G NR that involves PDCCH monitoring, according to the currently standardized version, will be explained in a simplified and abbreviated form in the following.

To reduce the battery consumption in the UE, a mechanism to minimize the time the UE spends monitoring the PDCCH is used, which is called the Discontinuous Reception (DRX) functionality. DRX functionality can be configured for RRC_IDLE, in which case the UE uses either the specific or default DRX value (defaultPagingCycle); the default paging cycle is broadcasted in the System Information and can have values of 32, 64, 128 and 256 radio frames. The UE needs to wake up for one paging occasion per DRX cycle, the paging occasion being one subframe. DRX functionality can be also configured for an "RRC_CONNECTED" UE, so that it does not always need to monitor the downlink control channels for downlink control information (or phrased simply: the UE monitors the PDCCH) (see 3GPP Technical Standard TS 36.321, 15.6.0, chapter 5.7).

Beamforming

Beamforming is a solution for increasing the performance of a mobile network, which may allow for higher spectral efficiency, improved link performance and extended coverage. Beamforming was included in the NR specification in the first 3GPP Release 15. According to a traditional approach, data is transmitted over the whole area of a cell, whereas when beamforming is applied, the data is sent with comparably narrow beams.

Beams can be formed in a number of different ways, and either a fixed grid of beams may be provided or user-specific (UE-specific) beamforming may be performed.

Beamforming may be considered to be the application of multiple radiating elements transmitting the same signal at an identical wavelength and phase, which in combination create a longer targeted stream. That is the targeted stream is formed by reinforcing the waves in a specific direction. The direction of a beam may be changed by changing the phase of the radiating elements with a common frequency, wherein different frequencies may be used to for a beams steering in different direction.

Non-Terrestrial Networks

In 3GPP, NR-based operation in a non-terrestrial network (NTN) is studied and described (see, e.g., 3GPP TR 38.811, Study on New Radio (NR) to support non-terrestrial networks, version 15.0.0, and 3GPP TR 38.821, Solutions for NR to support non-terrestrial networks, version 0.3.0). Architectural aspects are studied in TR 23.737 (3GPP TR 23 737, Study on architecture aspects for using satellite access in 5G (Release 17), version 17.0.0).

The benefit is of the extension of NR communication services to remote areas, ships, airplanes, and the like. Thanks to the wide service coverage capabilities and reduced vulnerability of space/airborne vehicles to physical attacks and natural disasters, NTNs may foster the rollout of NR service in unserved areas that cannot be covered by terrestrial NR networks (for instance isolated or remote areas, on board aircraft or vessels) and unserved (for instance suburban and rural areas). Further, NTNs may reinforce NR service reliability by providing service continuity for passengers on moving platforms or ensuring service availability anywhere, especially for critical communication.

The benefits relate to either non-terrestrial networks operating alone or to integrated terrestrial and non-terrestrial networks, which may impact coverage, user bandwidth, system capacity, service reliability or availability.

A non-terrestrial network refers to a network, or segment of networks using RF resources on board of a satellite, for instance. NTNs typically feature the following system elements: an NTN terminal, which may refer to a 3GPP UE or a terminal specific to the satellite system in case a satellite does not serve directly 3GPP UEs; a service link which refers to the radio link between the user equipment and the space/airborne platform; an airborne platform embarking a payload; gateways that connect the space/airborne platform to the core network; feeder links which refer to the radio links between the Gateway Center space/airborne platform.

Satellite or other high-altitude platforms may consist of only a relay function from the access side to the feeder link to a ground station, or it may include part or all of NR radio baseband processing (e.g., a part of a gNB or a full gNB). The remaining part of the network and core network may be located on the ground. Satellites may also have a link to another satellite (Inter-Satellite Link, ISL), which may be beneficial if the satellite cannot reach any ground station directly.

The NTN architecture may use existing NR logical interfaces, protocols and concepts with adaptions to cope with longer latencies and/or other NTN specifics, for example.

A transmission between a terminal (UE) may be performed via a remote radio unit including a satellite and an NTN gateway. A gNB may be located at the gateway as a scheduling device/base station. The satellite payload may implement frequency conversion and radiofrequency amplifier in both uplink and downlink direction. Hence, the satellite may repeat the NR radio interface from the feeder link (between the NTN gateway and the satellite) to the service link (between the satellite and the UE) and vice versa. A satellite in this configuration is referred to as a transparent satellite.

A transmission between a terminal (UE) may also be performed via a satellite including a gNB as a scheduling device/base station. A satellite in this configuration is referred to as a regenerative satellite.

The satellite may be in a low earth orbit (LEO), that is, at approximately 600 or 1200 km altitude, or in a geostationary orbit, that is, at approximately 35786 km altitude. In GEO orbit, the satellite's position does not alter substantially over time with respect to the Earth's surface, whereas in LEO orbit, the satellite moves with respect to the surface.

Table 1 summarized reference scenarios of NTNs, wherein the satellite may be either in GEO or LEO. In a case where the satellite is in LEO, the beams may be either steerable or move along with the movement of the satellite, which itself may be either transparent or regenerative.

TABLE 1

NTN Reference Scenarios

| | Transparent satellite | Regenerative satellite |
|---|---|---|
| GEO based non-terrestrial access network | Scenario A | Scenario B |
| LEO based non-terrestrial access network: steerable beams | Scenario C1 | Scenario D1 |
| LEO based non-terrestrial access network: the beams move with the satellite | Scenario C2 | Scenario D2 |

In NTNs, the paging framework of a terrestrial network may be reused. That is, the core network may maintain and/or configured tracking areas, whereas a UE is not aware of how TAs are maintained or configured. That is, a UE may be registered by an access and mobility management function (AMF) of the core network to a TA before the UE enters RRC_IDLE mode. This may allow for the UE to receive paging messages from the network as long as the UE stays in the registered TA.

The UE may acquire the TAC by reading the SIB1 broadcasted by gNB, and may compare the received TAC with the TAC of the registered TA to know whether it has left the registered TA or not. In a case where the UE has left the registered TA, a TAU procedure may be performed in order to receive a new registered TA from AMF.

Power-Saving Enhancements

It is critical to study UE power consumption to ensure that UE power efficiency for 5G NR UEs can be better than that of LTE, and that techniques and designs for improvements are identified and adopted. 3GPP is currently studying how to save UE power taking into considerations latency and performance in the NR system, in particular in a NTN.

However, the inventors have identified further instances where the UE consumes power that should be best avoided.

In an NTN with a base station located on a satellite in LEO, for instance, a tracking area associated with a cell served by said base station may move with respect to the Earth's surface. In other words, in a case where satellites/cells will not change the broadcasted TAC value, the TA will sweep over the ground as the cells move (moving tracking area). In consequence, a stationary UE would have to keep performing RAU in RRC_IDLE state, which would result in significant TAU overhead and unnecessary UE power consumption.

On the other hand, TA may be configured so as to be stationary with respect to the Earth's surface, regardless and independent from the position of cells moving with respect to the ground (fixed tracking area). That is, the TAs may be configured based on Earth's geographic location rather than based on the service area spanned by a set of base stations.

Figure 7A:
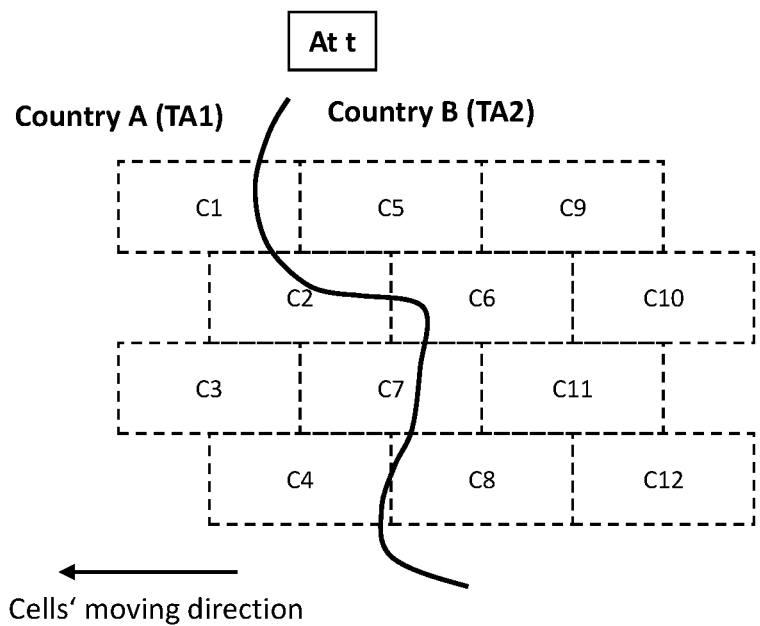
FIG. 7A illustrates a situation of moving cells and stationary tracking areas at a first time.
Figure 7B:
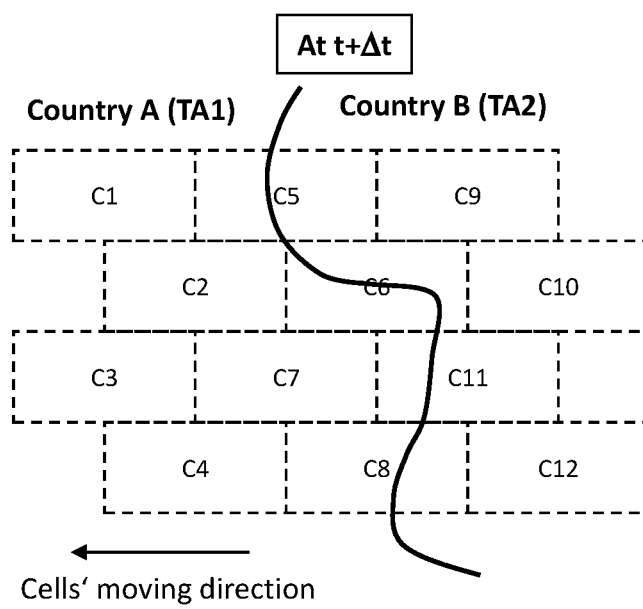
FIG. 7B illustrates the situation of moving cells and stationary tracking areas at a second time later than the first time.

This is illustrated in FIG. 7A and FIG. 7B. FIG. 7A illustrates a situation at a certain time t, where a plurality of cells C1-C12 are located in the vicinity of a boundary between two tracking areas TA1 and TA2 (the boundary is indicated as a bold line). The boundary may, for instance, be set so as to correspond to the border line of two neighboring countries A and B. FIG. 7B illustrates the same geographical region as FIG. 7A, but at a different time t+Δt later than t. As can be seen from the illustration, the cells C1-C12 have moved from right to left by a certain distance, such that the relative position of the cells C1-C12 with respect to the boundary between TA1 and TA2 has changed. For example, C5, which was entirely within TA2 at time t is partially within TA1 and TA2 at time t+Δt. Further, for example, C7, which is partially within TA1 and TA2 at time t, is located within TA1 entirely at time t+Δt.

Figure 8A:
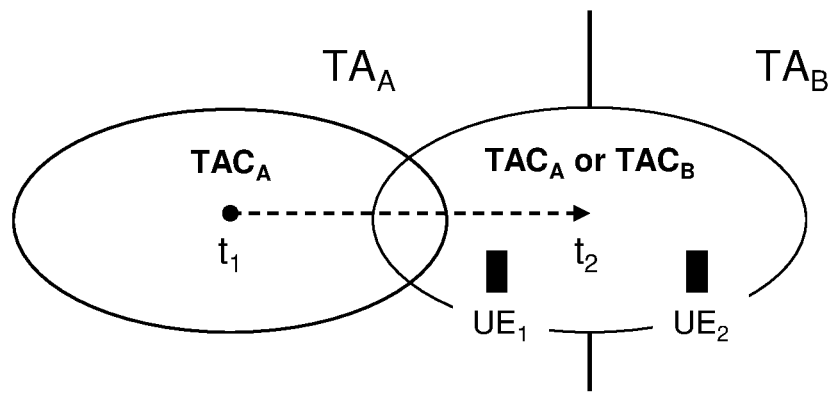
FIG. 8A illustrates a hard-switch option for tracking area code broadcasting when a moving cell crosses a boundary between tracking areas.

In a situation with stationary TAs and moving cells, a base station serving a moving cell may change the broadcasted TAC when moving from within a first TA to within a second TA. For this purpose, two basic approaches are conceivable:

First, in an option called hard-switch option, a cell is only allowed to broadcast one TAC per PLMN in SIB1. Further, when the cell is moving towards a boundary between two TAs, the cell broadcasts a first TAC associated with the first TA and switches to broadcasting a second TAC associated with the second TA. This is illustrated in FIG. 8A, where a cell (indicated in an elliptical shape) is located within $TA_A$ at time $t_1$ and moves due to the movement of the satellite, so as to be located partially within $TA_A$ and $TA_B$ at time $t_2$. At time $t_2$, either $TAC_A$ or $TAC_B$ is broadcasted in SIB1. In a case where $TAC_A$ is broadcasted, $UE_2$, which is located within and registered with $TA_B$ performs a TAU procedure. Further, when the cell moves further and then is entirely located within $TA_B$ at a later time, for instance, $TAC_B$ would be broadcasted, such that $UE_2$ would again perform a TAU update procedure.

In the hard-switch option, the first TAC may be broadcasted in a case where the cell is within the first TA, the second TAC may be broadcasted in a case where the cell is within the second TA, and either the first TAC or the second TAC may be broadcasted in a case where the cell is partially within the first TA and the second TA.

Figure 8B:
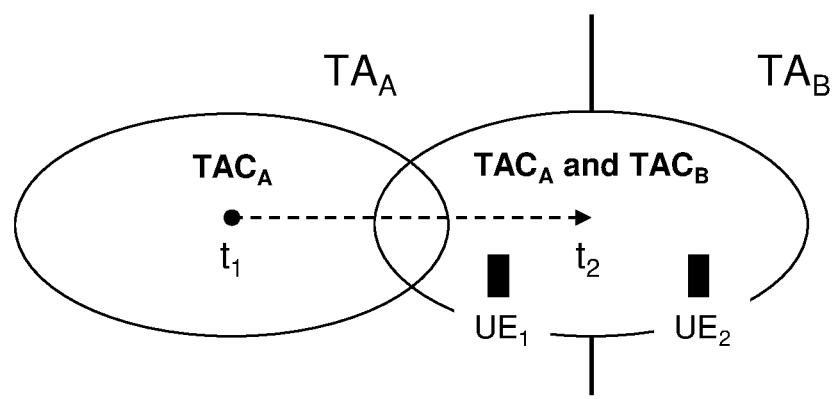
FIG. 8B illustrates a soft-switch option for tracking area code broadcasting when a moving cell crosses a boundary between tracking areas.

Second, in an option called soft-switch option, a cell is allowed to broadcast more than one, i.e., a plurality of, TACs per PLMN in SIB1. When the cell is located partially within more than one TAs, more than one associated TACs may be broadcasted. This is illustrated in FIG. 8B, where a cell (indicated in an elliptical shape) is located within $TA_A$ at time $t_1$ and moves due to the movement of the satellite, so as to be located partially within $TA_A$ and $TA_B$ at time $t_2$. At time $t_2$, both $TAC_A$ and $TAC_B$ are broadcasted in SIB1. In this case, neither $UE_1$ nor $UE_2$, which are located within $TA_A$ and $TA_B$, respectively, performs a TAU procedure.

However, in the hard-switch option, a UE performs a TAU upon detecting that the registered TAC is no longer broadcasted in the cell. Such a TAU could result in ping-pong TAU procedures, as described further above and, in consequence, increases an overall signaling overhead and consumes UE power.

Further, in the soft-switch option, the gNB signaling overhead is increased significantly while the cell moves from within a first TA to within a second TA, as more than one TAC is broadcasted in SIB1. Further, the signaling overhead is increased as gNB may page all UEs registered to the TACs that are broadcasted by the gNB (e.g., the first TAC and the second TAC).

In the following, UEs, base stations, and procedures to addressing above issues will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

The present disclosure provides apparatuses and techniques which may facilitate for reduced power consumption and signaling overhead.

Figure 9:
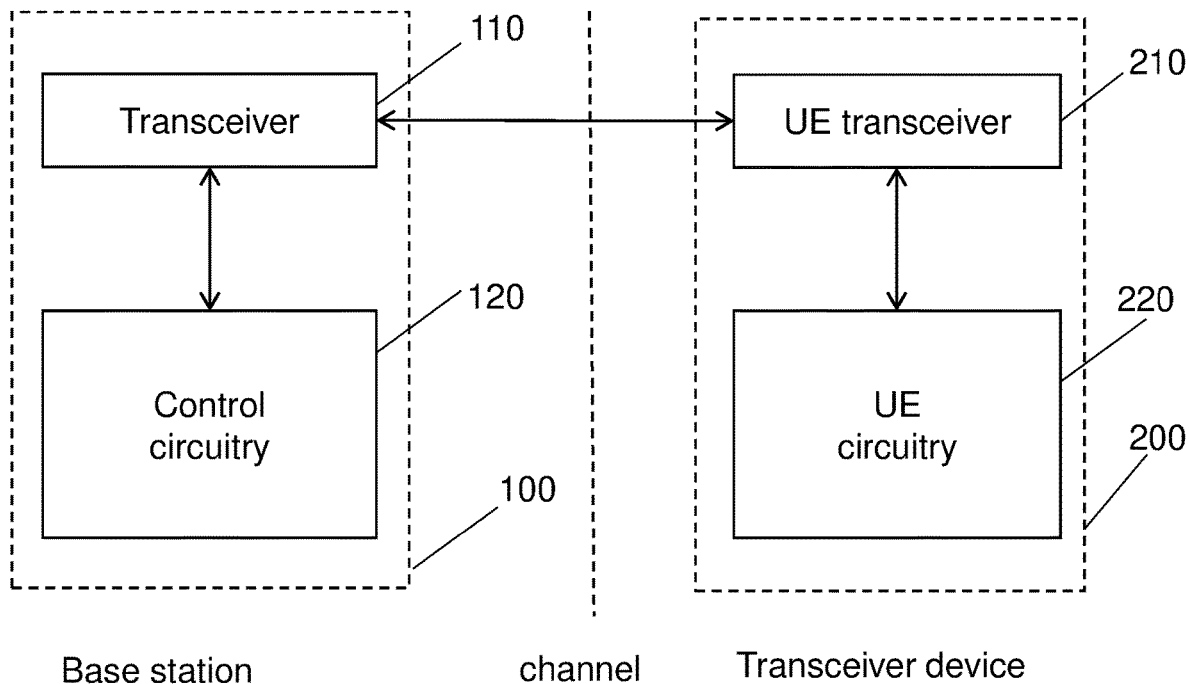
FIG. 9 is a block diagram showing the functional components of a base station and a transceiver device according to an embodiment.

The disclosure provides a base station and a transceiver device as shown in FIG. 9.

The base station 100 comprises a transceiver 110 and circuitry 120. The circuitry, in operation, controls the transceiver 110 to serve a cell associated with a first tracking area code and to periodically transmit, in system information, a TAC indicator indicating at least one TAC associated with the cell. Further, the circuitry 120, in operation, controls the transceiver 110 to transmit a trigger indicator for triggering a transceiver device to perform a system information update procedure when a content of the system information changes, wherein the circuitry 120, in operation, prevents the transceiver 110 from transmitting the trigger indicator in a case where the cell is being associated with a second TAC due to a movement of the cell.

For instance, the base station 100 is a network node in a NR network system (a gNB) or in a similar communication system. The circuitry 120 is also referred to as "control circuitry" to distinguish it from circuitry such as the UE circuitry 220.

The transceiver device comprises a transceiver 210 and circuitry 220. The transceiver device 200 may be served by the base station. The transceiver 210 may, in operation, receive a trigger indicator indicating a change in system information. Further, the circuitry 220, in operation, may control the transceiver 210 to perform a system information update procedure when the trigger indicator is received.

For instance, the transceiver device 200 is a UE in a NR network. Accordingly, the transceiver 210 and circuitry 220 are also referred to as "UE transceiver" and "UE circuitry." However, these terms are merely used to distinguish the transceiver 210 and the circuitry 220 from circuitry and transceiver(s) comprised by other devices such as a base station 100. The transceiver device 200 may be a terminal service, relay device, or communication device of a similar communication system.

Figure 10:
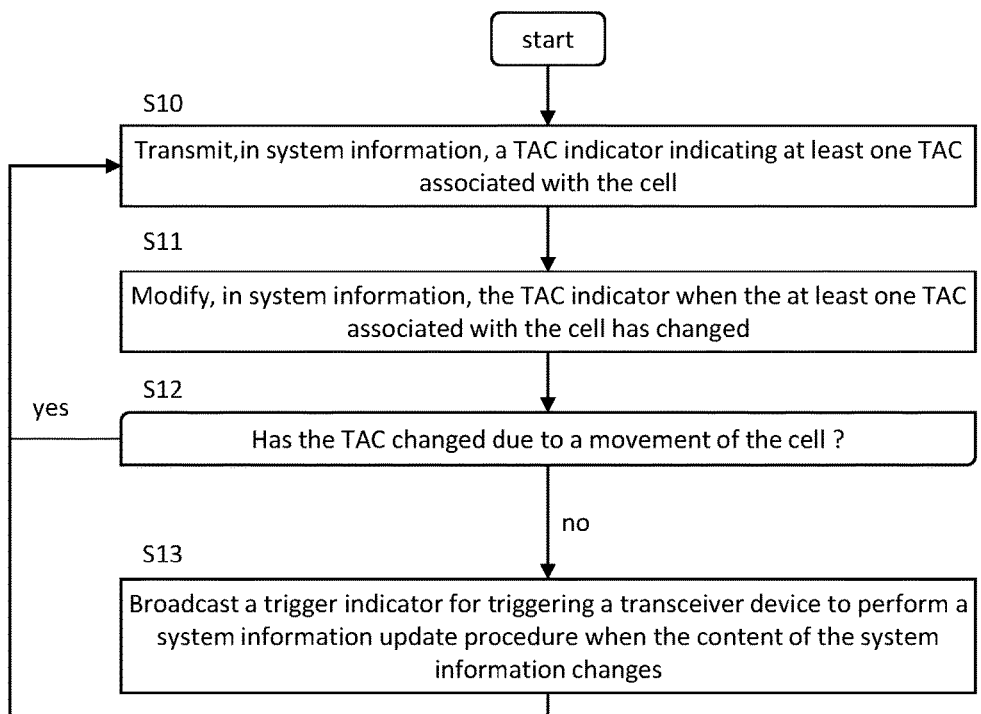
FIG. 10 illustrates the steps of a method performed by a base station, according to an embodiment.

FIG. 10 illustrates the steps of a method according to an embodiment. The method may be performed by a base station according to an embodiment. In step S10, a TAC indicator is transmitted in system information. For instance, the TAC indicator may be transmitted from a base station to a transceiver device. The TAC indicator indicates at least one tracking area code, TAC, which is associated to a served cell. In step S11, the TAC indicator in system information is modified when the at least one TAC associated with the cell is changed. In step S12, it is determined whether the change of the TAC is due to a movement of the cell. In a case where the change of the TAC is not due to a movement of the cell (no in step S12), a trigger indicator for triggering a transceiver device to perform a system information update procedure is broadcasted in step S13 when the content of the system information changes. For instance, the trigger indicator may be broadcasted by the base station. After step S13, the method proceeds to step S10. In a case where the TAC has changed due to a movement of the cell (yes in step S12), the method proceeds to step S10. In other words, in a case where the TAC has changed due to a movement of the cell, the broadcasting of the trigger indicator is prevented/skipped.

Figure 11:
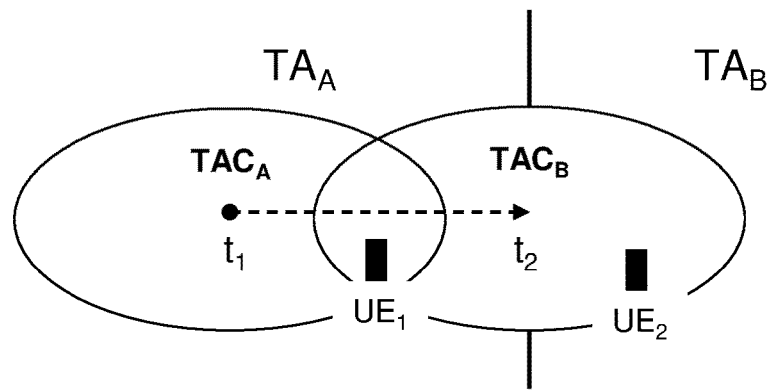
FIG. 11 illustrates a situation of a moving cell crossing a boundary of two TAs according to an embodiment.

In an embodiment, illustrated in FIG. 11, a moving cell (illustrated in an elliptical shape) is located within $TA_A$ at time $t_1$. The base station serving the cell may be located on a satellite in LEO, for instance. At $t_1$, the base station periodically transmits a TAC indicator indicating $TAC_A$. As indicated above, the cell's position on the Earth's surface changes in accordance with the movement of the satellite with respect to the surface. At time $t_2$, the cell is located partially within $TA_A$ and $TA_B$. At $t_2$, the base station periodically broadcasts a TAC indicator indicating $TAC_B$ (hard-switch option). $UE_1$ may be stationary located within $TA_A$ and, hence, is registered by AMF to $TA_A$. $UE_2$ may be stationary located within $TA_B$ and, hence, is registered by AMF to $TA_B$.

When the cell is associated at $t_2$ with the second TAC ($TAC_B$), which may be different from $TAC_A$, triggering of an SI update procedure is prevented. In other words, a trigger indicator indicating a change in system information is not broadcasted, even when the cell is associated with $TAC_B$ due to a movement of the cell from within $TA_A$ to (partially) within $TA_B$.

From $t_1$ to $t_2$, $UE_1$ stays within the cell and, due to the trigger indicator not being broadcasted, is not aware of the change of the TAC associated with the cell. Thus, $UE_1$ does not perform a TAU procedure.

Further, from $t_1$ to $t_2$, $UE_2$ leaves its original cell and enters the cell (due to the movement of the cells). In the framework thereof, due to the cell change, $UE_2$ reads the system information of the moving cell. As the broadcasted TAC at $t_2$ is $TAC_B$, i.e., equal to the TAC of the registered $TA_B$, $UE_2$ does not perform a TAU update procedure, even though the cell is changed.

That is, by preventing the trigger indicator from being broadcasted, neither $UE_1$ nor $UE_2$ needs to perform a TAU procedure and, hence, unnecessary power consumption may be reduced.

Preferably, when performing a paging procedure at $t_1$, the base station pages all UEs registered to $TA_A$. At $t_2$, however, when performing a paging procedure, the base station serving the moving cell pages all UEs registered to $TA_B$ as well as all UEs registered to $TA_A$. As soon as the cell is within $TA_B$, the base station serving the cell may page all UEs registered to $TA_B$ but may not page all UEs registered to $TA_A$, when performing a paging procedure. In other words, the base station may stop paging UEs registered to $TA_A$ when the cell is within $TA_B$.

In other words, when the TAC is changed due to a movement of the cell, the trigger indicator for triggering a SI update procedure is prevented from being broadcasted.

Further, in order to perform a paging procedure as described above, the base station may keep a record of previous TACs associated with the cell.

If the transceiver device is aware that the base station does not transmit a trigger indicator indicating a change in system information, as described above, the transceiver device may acquire SIB1 proactively if changes of the TAC should be determined/detected.

Figure 12:
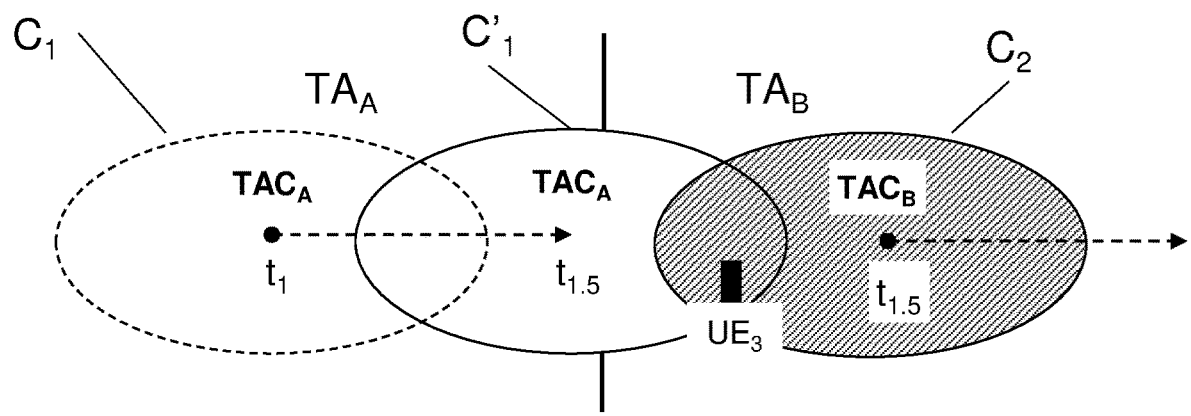
FIG. 12 illustrates cell selection in a situation of a moving cell crossing a boundary of two TAs according to an embodiment.

FIG. 12 illustrates a situation prior to the situation illustrated in FIG. 11, where the moving cell C1 (indicated by dashed lines) moves from within $TA_A$ at time $t_1$ to be partially within $TA_A$ and $TA_B$ at time $t_{1.5}$ (C'$_1$). At $t_{1.5}$, the cell C'$_1$ is not yet associated with $TAC_B$, but still with $TAC_A$ and, thus, the base station serving the cell C'$_1$ periodically broadcasts $TAC_A$. At time $t_{1.5}$ $UE_3$ is located in $TA_B$ and, hence, registered with $TA_B$. However, $UE_3$ is located within the coverage areas of the new cell C'$_1$ as well as the coverage area of the previous cell $C_2$ (indicated in a shaded manner). $UE_3$ is at time tis served by said cell $C_2$. However, as the signal strength of $C_2$ decreases while at the same time the signal strength of C'$_1$ increases, $UE_3$ may eventually perform a change for the serving cell from $C_2$ to C'$_1$.

However, this change may require $UE_3$ to perform a TAU update procedure, as C'$_1$ is broadcasting $TAC_A$ at $t_{1.5}$. Thus, $UE_3$ determines whether it is switched from cell $C_2$ to cell C'$_1$ depending on whether the TAC broadcasted in cell C'$_1$ is equal to or different from the TAC to which the $UE_3$ is registered, and/or depending on whether the TAC broadcasted in cell $C_2$ is equal to or different from the TAC to which the $UE_3$ is registered.

Figure 13:
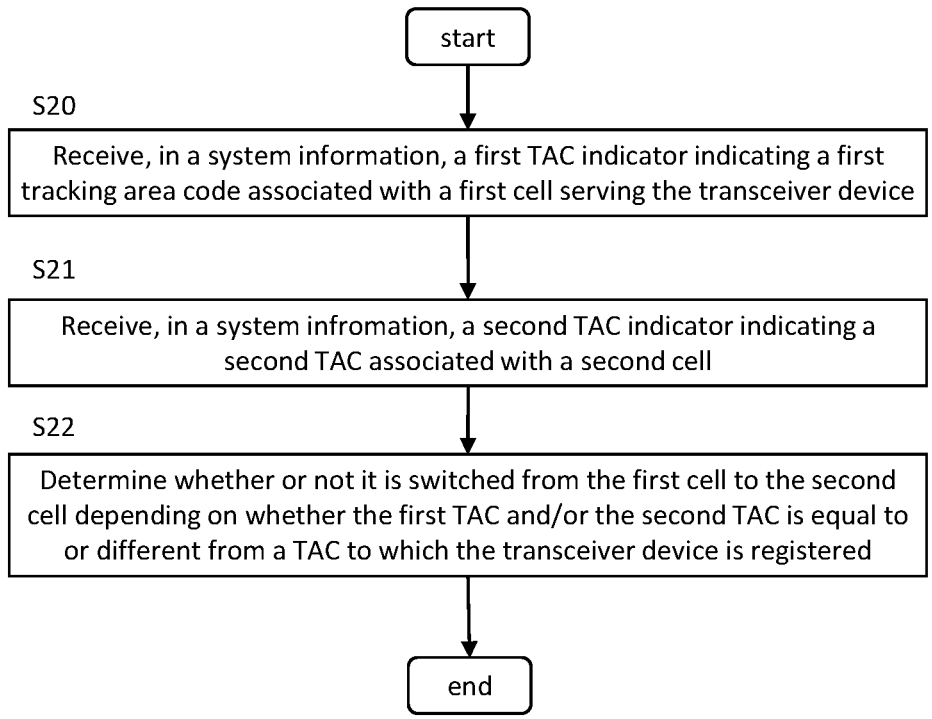
FIG. 13 illustrates the steps of a method performed by a transceiver device, according to an embodiment.

FIG. 13 illustrates the steps of a method according to an embodiment. For instance, the method may be performed by a transceiver device according to an embodiment. In step S20, a first TAC indicator indicating a first tracking area code, TAC, associated with a first cell, which may serve a transceiver device, is received. In step S21, a second TAC indicator indicating a second TAC associated with a second cell is received. Further, in step S22, it is determined whether or not it is switched from the first cell to the second cell, depending on whether the first TAC and/or the second TAC is equal to or different from a TAC to which the transceiver device is registered.

For instance, a cell reselection criteria applied when selecting a new serving cell may depend on whether or not TACs broadcasted by the current cell and the potential new cell are equal to each other or not.

For this purpose, $UE_3$ may receive, in a system information, a first TAC indicator indicating a first TAC associated with cell $C_2$ and receive a second TAC indicator indicating the second TAC associated with cell C'$_1$. For example, the $UE_3$ may receive the second TAC indicator by listening to the SI broadcasted by the neighboring cell C'$_1$. Alternatively or additionally, the current cell $C_2$ may broadcasts both TAC indicators, i.e., an indicator indicating the own TAC and an indicator indicating one or more TACs associated with neighboring cells.

A cell reselection criteria is defined in TS 38.304, section 5.2.4.6 (3GPP 38.304, user Equipment (UE) procedures in Idle mode and RRC Inactive state (Release 16), version 16.0.0). This reselection criteria could be modified as:

$$R_s = Q_{meas,s} + Q_{hyst} - Q\text{offset}_{temp} + C \cdot \text{Serv}_{TAC}$$

$$R_n = Q_{meas,n} - Q_{offset} - Q\text{offset}_{temp} + C \cdot \text{Neigh}_{TAC}$$

$Q_{meas,s}$ and $Q_{meas,n}$ denote an RSRP measurement quantity used in cell reselections for the serving cell and the neighboring cell, respectively. $Q_{hyst}$ denotes a hysteresis value of the serving cell in order to prevent back-and-forth reselections. Qoffset$_{temp}$ is a cell-specific offset temporarily applied to a cell after a connection establishment failure. Qoffset denotes an offset in the cell ranking criterion of the neighboring cell as signaled by the network. Its value depends on whether the neighboring cell is on the same or different frequency as the UE's serving cell.

C denotes a constant value. Serv$_{TAC}$ is equal to 1 if the TAC value broadcasted by the serving cell is associated with a registered TA, and Serv$_{TAC}$ is equal to zero if the TAC value broadcasted by the serving cell is not associated with the registered TA. Further, Neigh$_{TAC}$ is equal to 1 if the TAC value broadcasted by the neighboring cell is associated with the registered TA, whereas Neigh$_{TAC}$ is equal to zero if the TAC value broadcasted by the neighboring cell is not associated with the registered TA.

That is, in a case where the TAC value broadcasted by the neighboring cell is not a TAC value associated with the registered TA, a reselection of the neighboring cell is delayed. With this approach, a reselection of the neighboring cell broadcasting a TAC not associated with the registered TA may be prevented.

In an embodiment, the base station may, additionally or alternatively to the above, turn off the transceiver 110 or prevent the transceiver from transmitting a system information in a case where the cell is partially within the first TA and the second TA.

Figure 14:
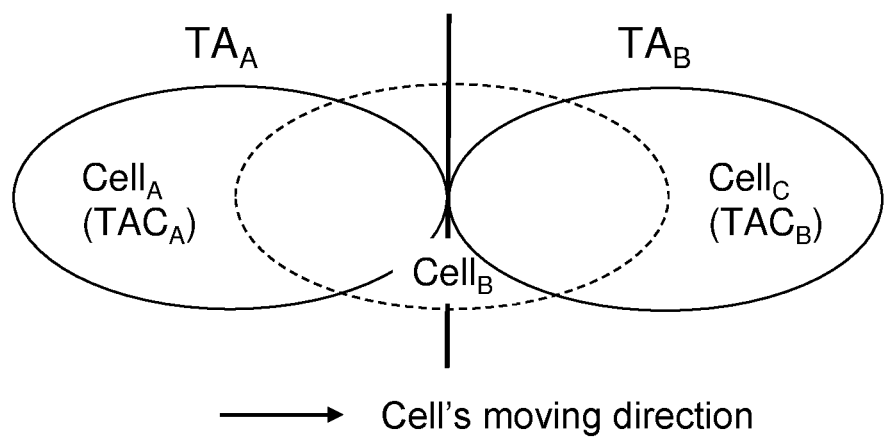
FIG. 14 illustrates a situation of a moving cell crossing a boundary of two TAs according to an embodiment, wherein a cell is turned off or broadcasting of system information is prevented.

FIG. 14 illustrates three cells served at a certain point in time. Cell$_A$ is located within TA$_A$, Cell$_C$ is located within TA$_B$, and Cell$_B$ is partially within TA$_A$ and TA$_B$. In Cell$_A$ TAC$_A$ is broadcasted periodically and in Cell$_C$ TAC$_B$ is broadcasted periodically. However, Cell$_B$ may be turned off entirely or the transmission of system information may be disabled or prevented. For instance, the circuitry 120 may prevent the transceiver from transmitting a system information when the cell is partially within the first TA$_A$ and the second TA$_B$.

When preventing a system information to be broadcasted when the cell is not entirely within a single TA, UEs camping on the cell may still be served, whereas selection of the cell is prevented, as the system information cannot be read. With this approach, UEs are prevented from performing a TAU procedure, which may result in power saving of the UE and a reduced signaling overhead.

Figure 15:
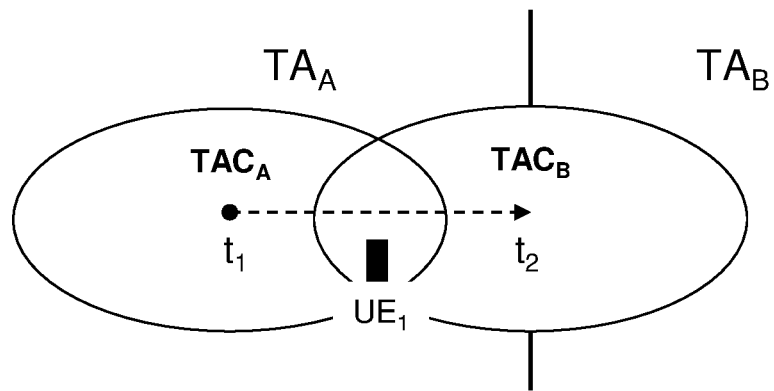
FIG. 15 illustrates a situation of a moving cell crossing a boundary of two TAs according to an embodiment applying the hard-switch option.

In an embodiment, a moving cell is moving towards a boundary of two TAs, as illustrated in FIG. 15. At a first time $t_1$, the entire cell is within the first tracking area TA$_A$ and broadcasts, in a system information, the first tracking area code TAC$_A$. At a second time $t_2$ later than the first time $t_1$, the cell is partially located within TA$_A$ and a second tracking area TA$_B$. At the second time $t_2$, a second tracking area code, TAC$_B$ is broadcasted in the system information (hard-switch option). A stationary UE$_1$ is located within TA$_A$.

In the embodiment, additionally or alternatively to the above, the AMF assigns both TAs (TA$_A$ and TA$_B$) to UE$_1$. For this purpose, UE$_1$ may report its location, for instance, in the framework of a periodic TAU procedure. For instance, the UE$_1$ may determine its position based on readings of a GNNS (Global Navigation Satellite System: GPS, for instance) receiver or via a Wi-Fi positioning system, wherein characteristics of nearby Wi-Fi hotspots and/or other wireless access points may be used to determine where UE$_1$ is located. However, the position determination is not limited to said methods, and any other method may be applied as well. For instance, UE$_1$ may obtain its position by user input.

AMF may assign TA$_A$ and TA$_B$ to UE$_1$ in a case where the reported position is within a certain threshold distance from a boundary between TA$_A$ and TA$_B$. The threshold distance may be predetermined or dynamically configured/determined.

In other words, an access and mobility managing device (for instance, a core entity performing an AMF), may receive a location indicator indicating the location of a transceiver device. Further, the access and mobility managing device may determine whether or not the location is within a threshold distance from a boundary between the first TA and the second TA and, may register the transceiver device with both the first TA and the second TA in a case where the location is within the threshold distance from the boundary. Further, the access and mobility managing device may cause a base station to transmit a TAC indicator indicating the first TAC and the second TAC to the transceiver device during a procedure when the transceiver device is registered to the network.

Figure 16:
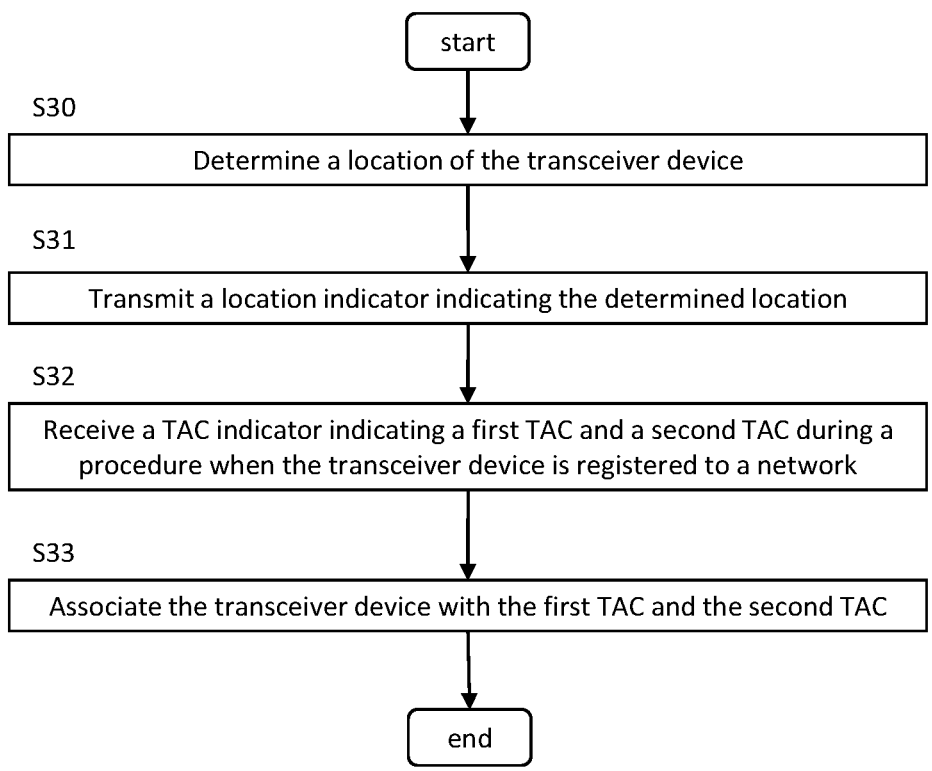
FIG. 16 illustrates the steps of a method performed by a transceiver device, according to an embodiment.

FIG. 16 illustrates the steps of a method according to an embodiment. The method may be performed by a transceiver device according to an embodiment. In step S30, a location of the transceiver device is determined. Further, in step S31, a location indicator indicating the determined location is transmitted. For instance, the location indicator is transmitted to a base station. In step S32, a TAC indicator is received. The TAC indicator indicates a first tracking area code, TAC, and a second TAC during a procedure when the transceiver device is registered to a network. Further, in step S33, the transceiver device is associated with the first TAC and the second TAC.

During a paging procedure, where the transceiver device should be reached, the access and mobility managing device may transmit a paging request message to the base station covering either the first TA or the second TA, in order to reach the transceiver device registered to the first TA and/or the second TA.

The access and mobility managing device may transmit a paging request to a base station to page a transceiver device registered to the first TA, when the base station is associated with the first TA. Further, the access and mobility managing device may transmit a paging request to a base station to page a transceiver device registered to the second TA, when the base station is associated with the second TA. Still further, the access and mobility managing node may transmit a paging request to a base station to page a transceiver device registered to either the first TA or the second TA, when the base station is associated with the first TA and the second TA.

The base station, after having received a paging request, may transmit a paging message according to the received paging request.

With this approach, UE$_1$ does not perform a TAU update procedure at time $t_2$, irrespective of the actual TAC broadcasted by the base station/gNB.

However, even if UE$_1$ is stationary, UE$_1$ will be paged by AMF in both tracking areas TA$_A$ and TA2, as UE$_1$ is registered to both TAs. This may increase signaling overhead during a paging procedure.

In order to reduce the impact thereof, the geographical structure of the (stationary TAs) may be configured such that large TAs are surrounded by a plurality of small TAs. A large TA may be a TA whose area is above a certain first threshold area, whereas a small TA may be a TA whose area is below a certain second threshold area. The first threshold area may be equal to or larger than the second threshold area.

An example of such a geographical configuration of TAs is illustrated in FIG. 17A and FIG. 17B. Said figures illustrate four large TAs (TA1-TA4), which are separated from each other by a plurality of small TAs (ta, for reasons of clarity, only three ta's are marked in the figures).

Although the large and the small TAs are illustrated as being rectangular, the shape of the tracking areas may be any other shape than rectangular. For instance, the shape of tracking areas may follow the shape of a border of adjacent countries.

The large tracking areas TA and the small tracking areas ta may be configured such that each of two large tracking areas are not adjacent to each other, but separated from each other by one or a plurality of small tracking areas.

With this configuration, in a case where a UE is registered for at least two TAs due to its location being close to the boundary of two tracking areas, a paging overhead may be reduced, as, although the UE is paged in more than one tracking area, the total area of the tracking areas the UE is registered with is reduced in comparison to a case where the UE is registered to two large tracking areas.

In an embodiment, a moving cell is moving towards a boundary of two TAs, as illustrated in FIG. 18. Specifically at time $t_1$, the cell is within the first tracking area $TA_A$ and broadcasts the first tracking area code $TAC_A$ associated with the cell and with $TA_A$. At a second time $t_2$ later than the first time $t_1$, the cell is located partially within $TA_A$ and the second tracking area $TA_B$ and broadcasts both $TAC_A$ and the second tracking area code $TAC_B$ associated with the cell and $TA_B$. A first transceiver device $UE_1$ is stationary located within $TA_A$, whereas a second transceiver device $UE_2$ is stationary located within $TA_B$. $UE_1$ is registered to $TA_A$ by AMF, whereas $UE_2$ is registered to $TA_B$ by AMF.

$UE_1$ stays in the cell from $t_1$ to $t_2$. At $t_2$, although the transceiver of the base station starts to broadcast both $TAC_A$ and $TAC_B$, the base station does not send a trigger indicator indicating the change of system information. This may prevent $UE_1$ from performing a system information update procedure, as it is not aware of the additional association to $TA_B$ of the cell.

During a paging procedure at $t_1$, the base station transmits a paging message to UEs registered to $TA_A$, in particular to $UE_1$. During a paging procedure at time $t_2$, the base station transmits a paging message to UEs registered to $TA_B$ as well as to UEs registered to $TA_A$. That is, in the example illustrated in the figure, $UE_1$ is paged during a paging procedure at time $t_1$. Further, in the illustrated example, UE and $UE_2$ are paged during a paging procedure at $t_2$.

This may allow for paging the intended UEs at $t_1$ and at $t_2$, wherein the UEs do not perform a system information update procedure due to the additional association of $TAC_B$ to the moving cell, as the trigger indicator is prevented from being transmitted by the base station.

Figure 19:
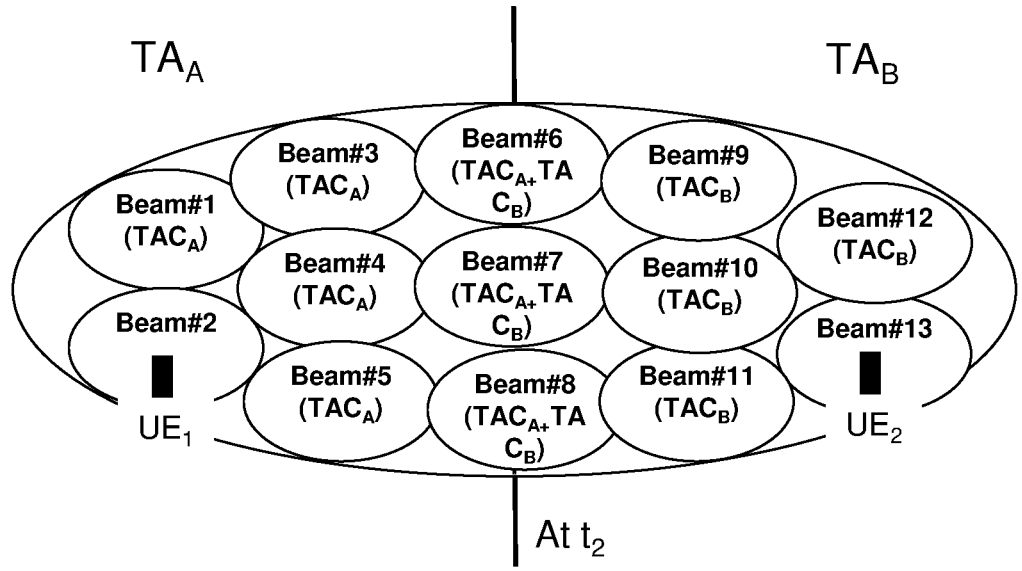
FIG. 19 illustrates a cell served by utilizing a plurality of beams, in a situation of the cell crossing a boundary between two TAs.

In an embodiment, additionally or alternatively, the circuitry of the base station controls the transceiver to serve the cell using a plurality of beams, as illustrated in FIG. 19. Just as in the preceding embodiment, the cell is partially within the first tracking area $TA_A$ and partially within the second tracking area $TA_B$ at time $t_2$. Further, the base station serving the cell broadcasts $TAC_A$ and $TAC_B$.

Specifically, as indicated in FIG. 19, the first TAC, namely $TAC_A$ is broadcasted using a first subset of beams (Beam #1 to Beam #5), wherein the beams of the first subset of beams are located within $TA_A$. Further, the second TAC, namely $TAC_B$, is broadcasted using a second subset of beams (Beam #9 to Beam #13), wherein the beams of the second subset of claims are located within $TA_B$. Still further, the first and the second TAC, namely $TAC_A$ and $TAC_B$ are broadcasted using a third subset of beams (Beam #6 to Beam #8), wherein the beams of the third subset of beams is located partially within $TA_A$ and $TA_B$.

Just as in the embodiments described above, the circuitry of the base station serving the cell prevents the transceiver from transmitting the trigger indicator indicating the change of system information, when the cell starts to be associated with the second $TA_B$ due to a movement of the cell.

By broadcasting both TACs at $t_2$, the signaling overhead of the broadcasting may be reduced, as two TACS are only broadcasted in a subset of the beams of the cell. The cells located entirely within a single TA broadcast the TAC associated with said single TA.

For instance, at $t_2$, it may not be necessary during a paging procedure to page UEs using all beams. That is, in the example illustrated in FIG. 19, Beam #1 to Beam #5, i.e., the first subset of beams, may be used to page UEs registered to $TA_A$. Further, Beam #9 to Beam #13, i.e., the second subset of beams, may be used to page UEs registered to $TA_B$. Still further, Beam #6 to Beam #8, i.e., the third subset of beams, may be used to page UEs registered to $TA_A$ or $TA_B$.

Although the broadcasting of TACs and the paging procedure using subset of beams is described above for a situation where the cell is at the boundary of two TAs, the same approach may be applied in a case where the cell is located partially within more than two TAs.

For instance, the cell may be at positions so as to be partially within three TAs. This may be the case in a situation where the cell is located at the meeting point of three neighboring TAs. In this situation, the circuitry may control the transceiver to broadcast a first TAC using a first subset of beams located within a first TA, to broadcast a second TAC using a second subset of beams located within a second TA, to broadcast a third TAC using a third subset of beams located within a third TA. Further, the circuitry may control the transceiver to broadcast the first TAC, the second and the third TAC using a fourth subset of beams located partially within the first TA, the second TA and the third TA. Still further, the circuitry may control the transceiver to broadcast the first TAC and the second TAC using a fifth subset of beams located partially within the first TA and the second TA, but not the third TA. Still further, the circuitry may control the transceiver to broadcast the first TAC and the third TAC using a sixth subset of beams located partially within the first TA and the third TA, but not the second TA. Still further, the circuitry may control the transceiver to broadcast the second TAC and the third TAC using a seventh subset of beams located partially within the second TA and the third TA, but not the first TA. In other words, the circuitry may control the transceiver to broadcast TACs associated with TAs, whose region overlap with a serving area of a beam, using said beam.

Similarly, the first subset of beams may be used to page UEs registered to the first TA, the second subset of beams may be used to page UEs registered to the second TA, and the third subset of beams may be used to page UEs registered to the third TA. Further, the fourth subset of beams may be used to page UEs registered to the first TA, the second TA or the third TA, the fifth subset of beams may be used to page UEs registered to the first TA or the second TA, the sixth subset of beams may be used to page UEs registered to the first TA or the third TA, and the seventh subset of beams may be used to page UEs registered to the second TA or the third TA.

However, as indicated above, the present disclosure is not limited to two or three neighboring TAs, and may be applied to four, five, or any other number of TAs having an overlapping region with a cell served by the base station.

This approach may allow for reducing broadcasting and paging overhead, as only subsets of beams are used to broadcast TACs and/or page desired UEs.

In an embodiment, a transceiver device may determine its position and mobility state and, depending thereon, transmit a location indicator indicating its position to a base station.

For instance, the transceiver device may obtain its position using reading of a GNSS receiver. The position of the transceiver device may be obtained a plurality of times. Based thereon, the transceiver device may determine whether it is in a high-mobility state, a medium-mobility state, or a stationary state. For instance, the transceiver device may determine that it is in the high-mobility state in a case where its velocity is equal to or above a first threshold. Further, the transceiver device may determine that it is in the medium-mobility state in a case where its velocity is equal to or above a second threshold, but below the first threshold. Further, the transceiver device may determine that it is in a stationary state in a case where its velocity is below the second threshold.

The second threshold may be preconfigured or dynamically set. For instance, the second threshold may be set to a velocity of 5 km/h, 10 km/h, 15 km/h or any other velocity. Further, the first threshold may be preconfigured or set dynamically. For instance, the first threshold may be set to a velocity of 100 km/h, 200 km/h or 300 km/h or any other velocity larger than the second threshold.

In a case where the transceiver device determined that it is in a stationary state, it reports its position, for instance in the framework of the periodic TAU procedure. AMF, knowing said position, may then initiate a paging procedure by sending a paging request message containing the reported position of the transceiver device to a base station. The base station then uses only a subset of beams of the base station to transmit the paging message, wherein the beams used for transmitting the paging message are determined according to the reported position of the transceiver device.

For instance, the transceiver device may be paged by using only the beam having a coverage area including the reported position. Alternatively, the transceiver device may be paged using the beam having a coverage area including the reported position and beams neighboring said beams.

Additionally or alternatively, the transceiver device may report its current beam ID and/or cell ID in order to allow for a determination which beams should be used during a paging procedure.

Further, the transceiver device may determine its mobility state based on a number of beams or cells changed over a certain period of time. For instance, in a case where the transceiver device changes its beam two times or less in the certain time period, it may determine its state being stationary. Further, in a case where the transceiver device changes its beam three times in the certain period of time, it may determine its state as being the medium-mobility state. Still further, in a case where the transceiver device changes its beam four times or more during the certain period of time, it may determine its state as being the high mobility state. The certain period of time may be, for instance, 10 sec, 20 sec, 30 sec, 1 min or any other period of time.

In an embodiment, the base station broadcasts a soft combining indicator indicating whether or not all of the plurality of beams are associated with an identical TAC. For instance, the soft combining indicator may be a dedicated 1-bit indication broadcasted in MIB. The indicator indicates 'true' in a case where soft-combining is possible and the indicator indicates 'false' in a case where soft-combining is not possible.

In a case where soft combining is possible, a transceiver device may determine the content of system information, for instance, from transmissions received from a plurality of beams. This may only be possible in a case where said beams transmit the same content in the system information. That is, in other words, soft-combining is possible in a case where the beams transmit the same TAC(s).

When the cell is passing through a boundary between TAs, the plurality of beams may broadcast different TAC(s), as illustrated in FIG. 19, for instance. Thus, when the cell passes over a boundary between TAs, soft-combining is not possible and, hence, the soft-combining indicator indicates 'false.' Note that soft-combining of MIB/SIBs received from the same beam at different time instances may be possible, even if the soft-combining indicator indicates 'false.'

Alternatively, rather than broadcasting a soft-combining indicator, the base station may broadcast, in system information, a mapping indicator indicating a mapping between the plurality of beams and the TAC(s) broadcasted by respective beams. In other words, the base station may inform the transceiver on which beams broadcast which TAC(s).

This approach may allow for the transceiver device to perform soft-combining using transmissions from the plurality of beams of the same cell.

Figure 20:
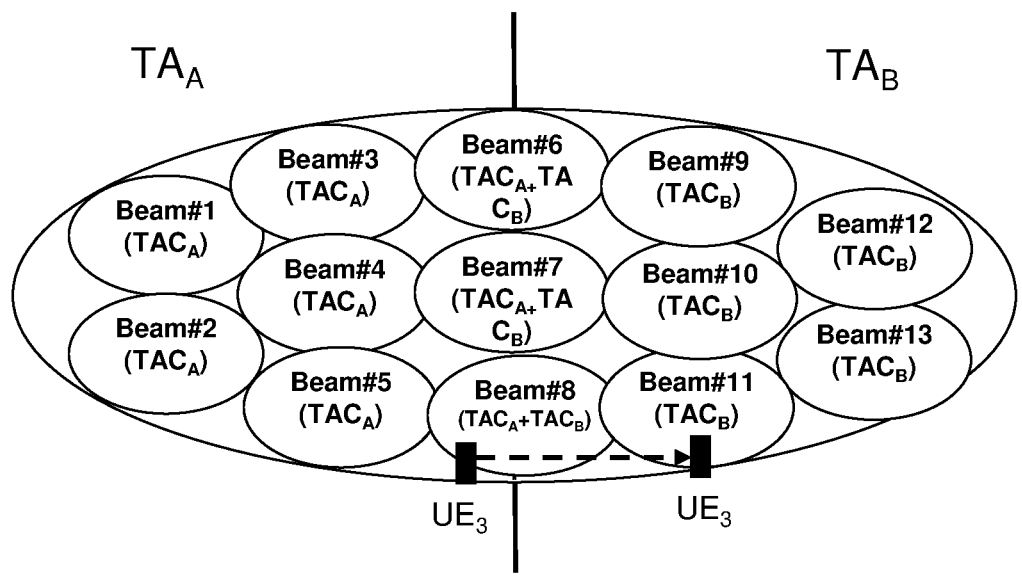
FIG. 20 illustrates a cell served by utilizing a plurality of beams, in a situation of the cell crossing a boundary between two TAs and a transceiver device crossing the boundary as well as changing the serving beam.

In an embodiment, a moving cell may be served by a base station using a plurality of beams, as illustrated, for instance, in FIG. 20. Just as in the preceding embodiment, the base station may broadcast different TACs using different subsets of beams, depending on the position of the beams with respect to the boundary of the tracking areas $TA_A$ and $TA_B$. Specifically, in the illustrated example, $TAC_A$ is broadcasted by Beam #1 to Beam #5, $TAC_A$ and $TAC_B$ is broadcasted using Beam #6 to Beam #8, and $TAC_B$ is broadcasted using Beam #9 to Beam #13.

$UE_3$ may be initially located within $TA_A$ and, thus, registered with $TA_A$. In a case where $UE_3$ moves at a high velocity (i.e., its mobility state is the high-mobility state), it may move across the boundary between $TA_A$ and $TA_B$ without changing the cell, but changing the beam. In the illustrated example, $UE_3$ moves from within a coverage area of Beam #8 to within a coverage area of Beam #11.

As $UE_3$ does not acquire system information when moving from Beam #8 to Beam #11, as the serving cell is not changed, it is not aware of a change of the TA and, thus, may not receive a paging message during a paging procedure.

However, when the soft-combining indicator is broadcasted by the base station, the $UE_3$ may monitor the broadcast of system information in a case where the soft-combining indicator indicates 'false,' i.e., when different beams transmit a different content of system information, i.e., when the cell is moving across a boundary of TAs, and the $UE_3$ determined its mobility state as being the high-mobility state, the $UE_3$ monitors the broadcasting of system information in order to receive the TAC indicator included in the system information. When the broadcasted TAC differs from the TAC which the $UE_3$ is registered to, a TAU procedure is performed. Alternatively, when the soft-combining indicator indicates 'false' and the mobility state of $UE_3$ is the high-mobility state, $UE_3$ may perform a TAU procedure when a change of the serving beam is detected.

Figure 21:
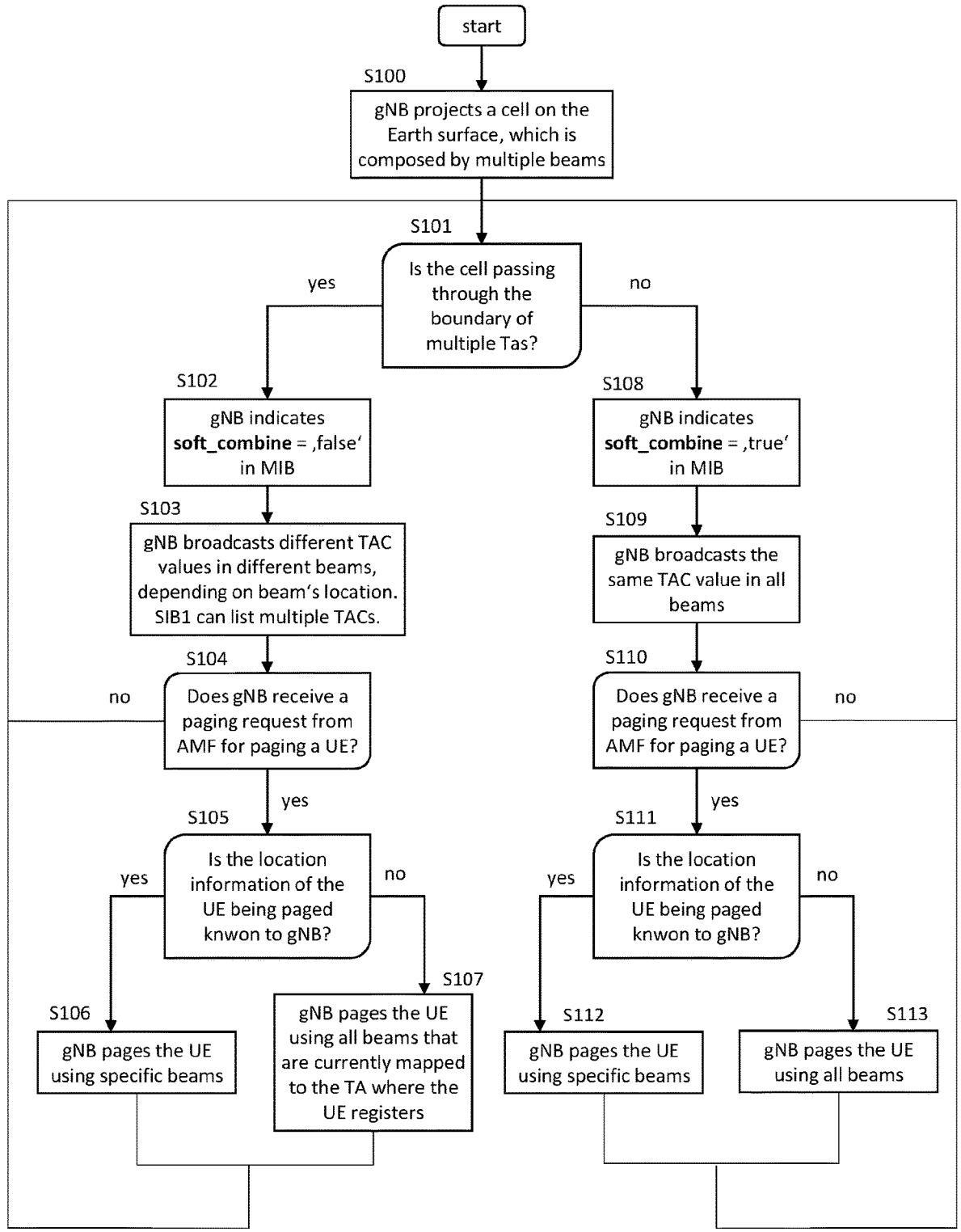
FIG. 21 illustrates a method performed by a base station according to an embodiment.

FIG. 21 illustrates the steps of a method performed by a base station according to an embodiment. In step S100, the base station (gNB) projects a cell on the Earth's surface using a plurality of beams. In other words, the cell is composed by a plurality of beams. Further, in step S101, it is determined whether or not the cell passes through a boundary of two or more TAs.

In a case where the cell passes through the boundary of multiple TAs (yes in step S101), the method proceeds to step S102.

In step S102, the soft-combining indicator ("soft_combine") is set to 'false' in MLB. Further, in step S103, gNB broadcasts in SIB1 different TAC values using different beams, depending on the beams' locations with respect to the TAs. In step S104, it is determined whether or not a paging request is received from AMF for paging a UE.

In a case where a paging request is not received (no in step S104), it is proceeded to step S101. However, in a case where gNB receives a paging request from AMF for paging the UE, it is determined in step S105 whether or not the location of the UE, which should be paged, is known by gNB. That is, it is determined whether or not information on the position of the UE to be paged is available to gNB or not.

In a case where the position of the UE is known (yes in step S105), the UE is paged using specific beams in step S107. For instance, the UE may be paged using a beam, whose coverage area includes the position of the UE. However, in a case where gNB is not aware of the position of the UE to be paged (no in step S105), gNB pages in step S107 the UE using all beams that are mapped to the TA where the UE is registered in step S107. After step S106 or step S107, the method proceeds to step S101 again.

In a case where the cell is not passing through a boundary of multiple TAs (no in step S101), the method proceeds to step S108, where gNB sets the soft combining indicator (soft_combine) to 'true,' thereby indicating that soft-combining is possible. Further, in step S109, the same TAC is broadcasted using all beams of the cell. In step S110, it is determined whether or not a paging request is received from AMF for paging a UE.

In a case where a paging request is not received (no in step S110), it is proceeded to step S101. However, in a case where gNB receives a paging request from AMF for paging the UE, it is determined in step S115 whether or not the location of the UE, which should be paged, is known by gNB. That is, it is determined whether or not information on the position of the UE to be paged is available to gNB or not.

In a case where the position of the UE is known (yes in step S11), the UE is paged using specific beams in step S112. For instance, the UE may be paged using a beam, whose coverage area includes the position of the UE. However, in a case where gNB is not aware of the position of the UE to be paged (no in step S111), gNB pages the UE using all beams of the cell in step S113. After step S112 or step S113, the method proceeds to step S101 again.

Figure 22:
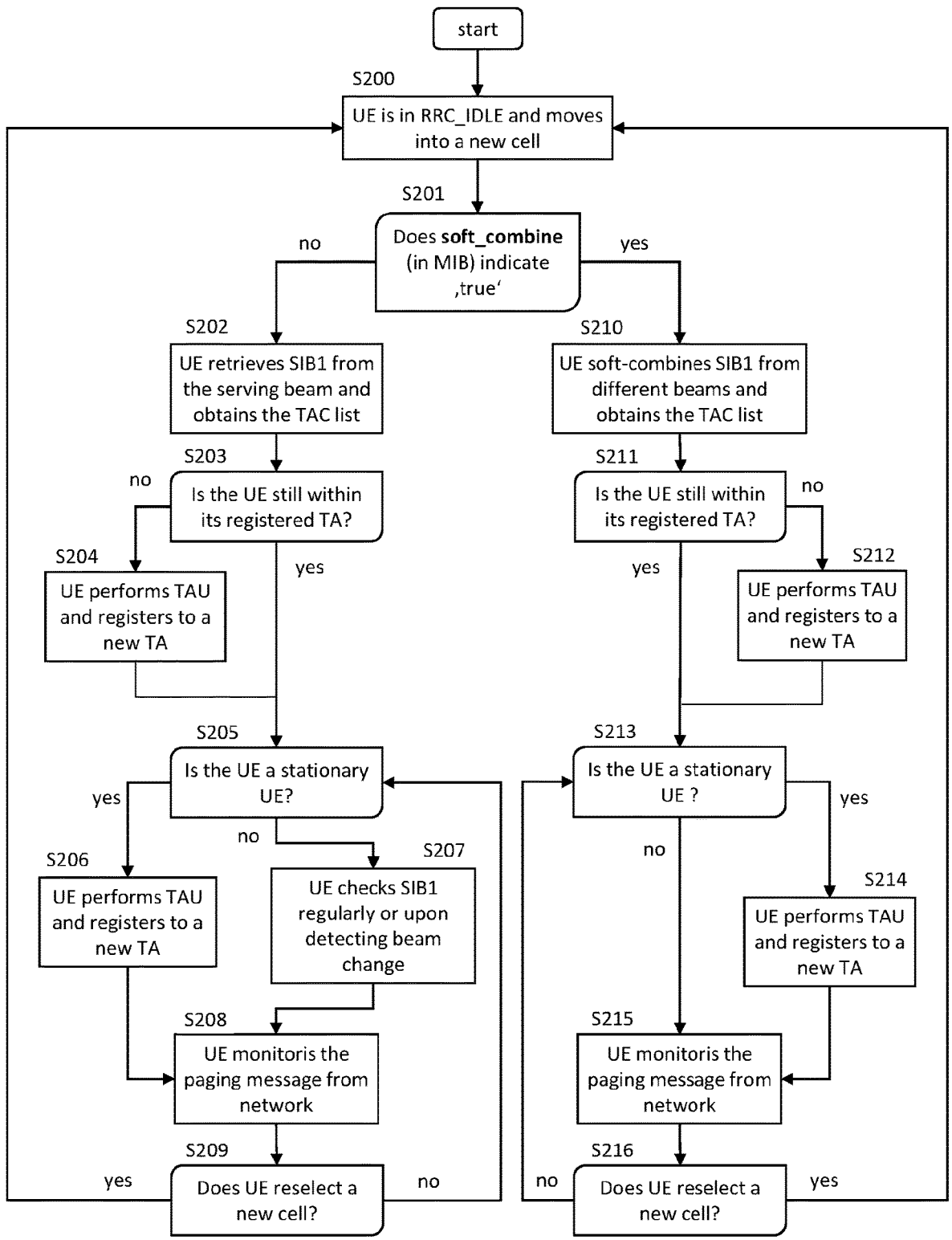
FIG. 22 illustrates a method performed by a transceiver device according to an embodiment

FIG. 22 illustrates the steps of a method performed by a transceiver device according to an embodiment, where the transceiver device (UE) is in RRD_IDLE state and moved into a new cell different from a current serving cell (S200).

In step S201, it is determined whether a received soft-combining indicator (soft_combine) indicates 'true,' i.e., it is indicated by the indicator that soft-combining is possible, i.e., all beams of the cell transmit the same TAC in system information.

In a case where the soft-combining indicator does not indicate 'true' (no in step S201), the method proceeds to step S202. In step S202, UE retrieves SIB1 broadcasted by gNB from the serving beam. Further, a list of TACs (TAC list) is obtained from SIB1. In step S203, it is determined whether the US is still within its registered TA. This may be performed by comparing a TAC associated with the UE with the TAC(s) indicated in the obtained TAC list.

In a case where the UE is no longer within its registered TA (no in step S203), a TAU procedure is performed and the US is registered to a new TA in step S204. Afterwards, the method proceeds to step S205. In a case where the UE is still within its registered TA (yes in step S203), it is proceeded to step S205 directly.

In step S205, it is determined whether or not the UE is a stationary UE. For instance, this may be performed as described in detail further above. For instance, the UE may determine that it is stationary in a case where its velocity is below a threshold value. The velocity may be obtained, for instance, from readings of a GNNS sensor.

In a case where the UE is determined as being stationary (yes in step S205), a TAU procedure is performed and the UE is registered to a new TA in step S206. In a case where the UE is determined as not being stationary (no in step S205), the broadcasting of system information is monitored by UE. In other words, the UE checks the content of broadcasted SIB1 regularly. Additionally or alternatively, UE may check SIB1 upon detection of a beam change.

In step S208, UE monitors for a transmission of a paging message from the network. Further, in step S209, it is determined whether or not a new cell is selected as the serving cell. In a case where it is determined that US does not perform a reselection of a new cell (no in step S209), it is proceeded to step S205. On the other hand, in a case where it is determined that UE selects a new cell (yes in step S209), the method proceeds to step S200 again.

In a case where the soft combining indicator (soft_combine) in MIB indicates 'true' (yes in step S201), the method proceeds to step S210, where the UE soft combines SIB1 from different beams and obtains the TAC list. In step S211, it is determined whether the US is still within its registered TA. This may be performed by comparing a TAC associated with the UE with the TAC(s) indicated in the obtained TAC list.

In a case where the UE is no longer within its registered TA (no in step S211), a TAU procedure is performed and the UE is registered to a new TA in step S212. Afterwards, the method proceeds to step S213. In a case where the UE is still within its registered TA (yes in step S211), it is proceeded to step S213 directly.

In step S213, it is determined whether or not the UE is a stationary UE. For instance, this may be performed as described in detail further above. For instance, the UE may determine that it is stationary in a case where its velocity is below a threshold value. The velocity may be obtained, for instance, from readings of a GNNS sensor.

In a case where the UE is determined as being stationary (yes in step S213), a TAU procedure is performed and the UE is registered to a new TA in step S214. In a case where the UE is determined as not being stationary (no in step S213), the broadcasting of system information is monitored by UE. In other words, the UE checks the content of broadcasted SIB1 regularly. Additionally or alternatively, UE may check SIB1 upon detection of a beam change.

In step S215, UE monitors for a transmission of a paging message from the network. Further, in step S216, it is determined whether or not a new cell is selected as the serving cell. In a case where it is determined that US does not perform a reselection of a new cell (no in step S216), it is proceeded to step S213. On the other hand, in a case where it is determined that UE selects a new cell (yes in step S216), the method proceeds to step S200 again.

As described above, provided are devices and methods enabling a reduction of power consumption and signaling overhead in a communication network. Although what has been described above is mainly applicable to UE in RRC_IDLE state, in which the tracking area, TA, is configured to UE, the described methods can be also applicable to UE in RRC_INACTIVE state, in which TA is replaced by the RAN-based Notification Area (RNA).

Provided is a base station, comprising a transceiver; and circuitry which, in operation, controls the transceiver to serve a cell associated with a first tracking area code, TAC, to periodically transmit, in system information, a TAC indicator indicating at least one TAC associated with the cell, and to transmit a trigger indicator for triggering a transceiver device to perform a system information update procedure when a content of the system information changes, wherein the circuitry, in operation, prevents the transceiver from transmitting the trigger indicator in a case where the cell is being associated with a second TAC due to a movement of the cell.

In some embodiments, the base station is configured to operate on a satellite.

For instance, the base station may be configured to operate on a satellite in low-earth orbit, LEO.

In some embodiments, the second TAC is different from the first TAC.

In some embodiments, the first TAC is associated with a first tracking area, TA; and the second TAC is associated with a second TA, wherein the first TA and the second TA are stationary.

In some embodiments, the transceiver, in operation, receives a location indicator indicating a location of the transceiver device; and the circuitry, in operation, controls the transceiver to transmit a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA.

In some embodiment, the transceiver, in operation, receives a location indicator indicating a location of the transceiver device; and the circuitry, in operation, determines whether or not the location is within a predetermined distance from a boundary between the first TA and the second TA, and controls the transceiver to transmit a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA In some embodiments, the movement of the cell is a movement from the first TA to the second TA.

For instance, the movement of the cell may be a movement from within the first TA to within the second TA.

In some embodiments, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In some embodiments, the transceiver, in operation, receives a paging request to page a transceiver device registered to the first TA, when the cell is within the first TA, receives a paging request to page a transceiver device registered to the second TA, when the cell is within the second TA, receives a paging request to page a transceiver device registered to either the first TA or the second TA, when the cell is partially within the first TA and the second TA, and transmits a paging message according to the received paging request.

In some embodiments, the circuitry, in operation, controls the transceiver to serve the cell using a plurality of beams, associates a first subset of the plurality of beams located within the first TA with the first TAC, associates a second subset of the plurality of beams located within the second TA with the second TA, and associates a third subset of the plurality of beams partially located within the first TA and the second TA with the first and/or second TAC.

In some embodiments, the transceiver, in operation, receives a position indicator indicating a position of the transceiver device; the circuitry, in operation, determines at least one of the plurality of beams using the position of the transceiver device, and controls the transceiver to transmit a paging message using the at least one of the plurality of beams determined by the circuitry.

For instance, the transceiver may be controlled to transmit the paging message using only the at least one of the plurality of beams.

In some embodiments, the transceiver, in operation, broadcasts a first TAC indicator indicating the first TAC using the first subset of beams, broadcasts a second TAC indicator indicating the second TAC using the second subset of beams, and broadcasts a third TAC indicator indicating the first TAC and/or the second TAC using the third subset of beams.

In some embodiments, the transceiver, in operation, broadcasts a soft combining indicator indicating whether or not all of the plurality of beams are associated with an identical TAC.

In some embodiments, the transceiver, in operation, broadcasts a mapping indicator indicating a mapping between the plurality of beams and the first and/or second TAC associated therewith.

In some embodiments, the first TAC is associated with the cell in a case where the cell is within in the first TA; the second TAC is associated with the cell in a case where the cell is within in the second TA; the circuitry, in operation, turns off the transceiver or prevents the transceiver from transmitting a system information in a case where the cell is partially within the first TA and the second TA.

Further provided is a method, the method comprising: serving a cell associated with a first tracking area code, TAC; periodically transmitting, in system information, a TAC indicator indicating at least one TAC associated with the cell; transmitting a trigger indicator for triggering a transceiver device to perform a system information update procedure when a content of the system information changes, wherein, the transmitting of the trigger indicator is prevented in a case where the cell is associated with a second TAC due to a movement of the cell.

In some embodiments, the method is performed by a base station.

For example, the base station may be configured to operate on a satellite.

For instance, the base station may be configured to operate on a satellite in low-earth orbit, LEO.

In some embodiments, the second TAC is different from the first TAC.

In some embodiments, the first TAC is associated with a first tracking area, TA; and the second TAC is associated with a second TA, wherein the first TA and the second TA are stationary.

In some embodiments, the method comprises receiving a location indicator indicating a location of the transceiver device, and transmitting a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA.

In some embodiment, the method comprises: receiving a location indicator indicating a location of the transceiver device; determining whether or not the location is within a predetermined distance from a boundary between the first TA and the second TA, and transmitting a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA In some embodiments, the movement of the cell is a movement from the first TA to the second TA.

For instance, the movement of the cell may be a movement from within the first TA to within the second TA.

In some embodiments, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In some embodiments, the method comprises: receiving a paging request to page a transceiver device registered to the first TA when the cell is within the first TA; receiving a paging request to page a transceiver device registered to the second TA, when the cell is within the second TA, receiving a paging request to page a transceiver device registered to either the first TA or the second TA, when the cell is partially within the first TA and the second TA, and transmits a paging message according to the received paging request.

In some embodiments, the method comprises serving the cell using a plurality of beams, associating a first subset of the plurality of beams located within the first TA with the first TAC, associating a second subset of the plurality of beams located within the second TA with the second TA, and associating a third subset of the plurality of beams partially located within the first TA and the second TA with the first and/or second TAC.

For example, the method may comprise receiving a position indicator indicating a position of the transceiver device, determining at least one of the plurality of beams using the position of the transceiver device, and transmitting a paging message using the at least one of the determined plurality of beams.

In some embodiments, the method comprises broadcasting a first TAC indicator indicating the first TAC using the first subset of beams, broadcasting a second TAC indicator indicating the second TAC using the second subset of beams, and broadcasting a third TAC indicator indicating the first TAC and/or the second TAC using the third subset of beams.

In some embodiments, the method comprises broadcasting a mapping indicator indicating a mapping between the plurality of beams and the first and/or second TAC associated therewith.

In some embodiments, the first TAC is associated with the cell in a case where the cell is within in the first TA; the second TAC is associated with the cell in a case where the cell is within in the second TA; and the method comprises turning off the serving of the cell or preventing the transmission of a system information in a case where the cell is partially within the first TA and the second TA.

Further provided is a transceiver device, comprising a transceiver which, in operation, receives, in a system information, a first TAC indicator indicating a first tracking area code, TAC, associated with a first cell serving the transceiver device, and receives, in a system information, a second TAC indicator indicating a second TAC associated with a second cell; and circuitry which, in operation, determines whether or not it is switched from the first cell to the second cell depending on whether the first TAC is equal to or different from the second a TAC to which the transceiver device is registered, and/or depending on whether the second TAC is equal to or different from a TAC to which the transceiver device is registered.

In an embodiment, the second TAC is different from the first TAC.

In an embodiment, the first TAC is associated with a first tracking area, TA; and the second TAC is associated with a second TA, wherein the first TA and the second TA are stationary.

In an embodiment, the transceiver, in operation transmits a location indicator indicating a location of the transceiver device, and receives a TAC indicator indicating the first TAC and the second TAC during a procedure when the transceiver device is registered to a network, in a case where the transceiver device is registered with the first TA and the second TA due to the location being within a threshold distance from a boundary between the first TA and the second TA.

In an embodiment, the movement of the cell is a movement from the first TA to the second TA For instance, the movement of the cell may be a movement from within the first TA to within the second TA.

In an embodiment, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In an embodiment, the cell is served using a plurality of beams, wherein a first subset of the plurality of beams located within the first TA is associated with the first TAC, a second subset of the plurality of beams located within the second TA is associated with the second TA, and a third subset of the plurality of beams partially located within the first TA and the second TA is associated with the first and/or second TAC.

In some embodiments, the transceiver, in operation, transmits a position indicator indicating a position of the transceiver device, and receives a paging message over at least one of the plurality of beams.

In some embodiments, the transceiver, in operation, receives a soft-combining indicator indicating whether or not all of the plurality of beams are associated with an identical TAC.

In some embodiments, the transceiver, in operation, receives a mapping indicator indicating a mapping between the plurality of beams and the first and/or second TAC associated therewith.

In some embodiments, the first TAC is associated with the cell in a case where the cell is within in the first TA; the second TAC is associated with the cell in a case where the cell is within in the second TA.

Further provided is a method, comprising: receiving, in a system information, a first TAC indicator indicating a first tracking area code, TAC, associated with a first cell serving a transceiver device; receiving, in a system information, a second TAC indicator indicating a second TAC associated with a second cell; and determining whether or not it is switched from the first cell to the second cell depending on whether the first TAC is equal to or different from the second a TAC to which the transceiver device is registered, and/or depending on whether the second TAC is equal to or different from a TAC to which the transceiver device is registered.

In an embodiment, the method is performed by the transceiver device.

In an embodiment, the movement of the cell is a movement from the first TA to the second TA For instance, the movement of the cell may be a movement from within the first TA to within the second TA.

In an embodiment, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In an embodiment, the cell is served using a plurality of beams, wherein a first subset of the plurality of beams located within the first TA is associated with the first TAC, a second subset of the plurality of beams located within the second TA is associated with the second TA, and a third subset of the plurality of beams partially located within the first TA and the second TA is associated with the first and/or second TAC.

In some embodiments, the method comprises transmitting a position indicator indicating a position of the transceiver device, and receiving a paging message over at least one of the plurality of beams.

In some embodiments, the method comprises receiving a soft-combining indicator indicating whether or not all of the plurality of beams are associated with an identical TAC.

In some embodiments, the method comprises receiving a mapping indicator indicating a mapping between the plurality of beams and the first and/or second TAC associated therewith.

In some embodiments, the first TAC is associated with the cell in a case where the cell is within in the first TA; the second TAC is associated with the cell in a case where the cell is within in the second TA.

Further provided is a transceiver device, comprising circuitry which, in operation, determines a location of the transceiver device: and a transceiver which, in operation, transmits a location indicator indicating the determined location, and receives a TAC indicator indicating a first tracking area code, TAC, and a second TAC during a procedure when the transceiver device is registered to a network, wherein the circuitry, in operation, associates the transceiver device with the first TAC and the second TAC.

In an embodiment, the second TAC is different from the first TAC.

In an embodiment, the first TAC is associated with a first tracking area, TA; and the second TAC is associated with a second TA, wherein the first TA and the second TA are stationary.

In an embodiment, the transceiver, in operation transmits a location indicator indicating a location of the transceiver device, and receives a TAC indicator indicating the first TAC and the second TAC during a procedure when the transceiver device is registered to a network, in a case where the transceiver device is registered with the first TA and the second TA due to the location being within a threshold distance from a boundary between the first TA and the second TA.

In an embodiment, the movement of the cell is a movement from the first TA to the second TA.

For instance, the movement of the cell may be a movement from within the first TA to within the second TA.

In an embodiment, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In an embodiment, the cell is served using a plurality of beams, wherein a first subset of the plurality of beams located within the first TA is associated with the first TAC, a second subset of the plurality of beams located within the second TA is associated with the second TA, and a third subset of the plurality of beams partially located within the first TA and the second TA is associated with the first and/or second TAC.

In some embodiments, the transceiver, in operation, transmits a position indicator indicating a position of the transceiver device, and receives a paging message over at least one of the plurality of beams.

In some embodiments, the transceiver, in operation, receives a soft-combining indicator indicating whether or not all of the plurality of beams are associated with an identical TAC.

In some embodiments, the transceiver, in operation, receives a mapping indicator indicating a mapping between the plurality of beams and the first and/or second TAC associated therewith.

In some embodiments, the first TAC is associated with the cell in a case where the cell is within in the first TA; the second TAC is associated with the cell in a case where the cell is within in the second TA.

Further provided is a method, comprising: determining a location of a transceiver device; transmitting a location indicator indicating the determined location; receiving a TAC indicator indicating a first tracking area code, TAC, and a second TAC during a procedure when the transceiver device is registered to a network, wherein the transceiver device is associated with the first TAC and the second TAC.

In an embodiment, the method is performed by the transceiver device.

In an embodiment, the movement of the cell is a movement from the first TA to the second TA.

For instance, the movement of the cell may be a movement from within the first TA to within the second TA.

In an embodiment, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In an embodiment, the cell is served using a plurality of beams, wherein a first subset of the plurality of beams located within the first TA is associated with the first TAC, a second subset of the plurality of beams located within the second TA is associated with the second TA, and a third subset of the plurality of beams partially located within the first TA and the second TA is associated with the first and/or second TAC.

In some embodiments, the method comprises transmitting a position indicator indicating a position of the transceiver device, and receiving a paging message over at least one of the plurality of beams.

In some embodiments, the method comprises receiving a soft-combining indicator indicating whether or not all of the plurality of beams are associated with an identical TAC.

In some embodiments, the method comprises receiving a mapping indicator indicating a mapping between the plurality of beams and the first and/or second TAC associated therewith.

In some embodiments, the first TAC is associated with the cell in a case where the cell is within in the first TA; the second TAC is associated with the cell in a case where the cell is within in the second TA.

Further provided is a base station, comprising a transceiver; and circuitry which, in operation, controls the transceiver to serve a cell associated with a tracking area code, TAC, to periodically transmit, in system information, a TAC indicator indicating at least one TAC associated with the cell, and to transmit a trigger indicator for triggering a transceiver device to perform a system information update procedure when a content of the system information changes, wherein the circuitry, in operation, turns off the transceiver or prevents the transceiver from transmitting the system information in a case where the cell is partially within a first tracking area and a second tracking area.

In some embodiments, the base station is configured to operate on a satellite.

For instance, the base station may be configured to operate on a satellite in low-earth orbit, LEO.

In some embodiments, the second TAC is different from the first TAC.

In some embodiments, the first TAC is associated with a first tracking area, TA; and the second TAC is associated with a second TA, wherein the first TA and the second TA are stationary.

In some embodiments, the transceiver, in operation, receives a location indicator indicating a location of the transceiver device; and the circuitry, in operation, controls the transceiver to transmit a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA.

In some embodiments, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In some embodiments, the transceiver, in operation, receives a paging request to page a transceiver device registered to the first TA, when the cell is within the first TA, receives a paging request to page a transceiver device registered to the second TA, when the cell is within the second TA, receives a paging request to page a transceiver device registered to either the first TA or the second TA, when the cell is partially within the first TA and the second TA, and transmits a paging message according to the received paging request.

In some embodiments, the circuitry, in operation, controls the transceiver to serve the cell using a plurality of beams, associates a first subset of the plurality of beams located within the first TA with the first TAC, associates a second subset of the plurality of beams located within the second TA with the second TAC, and associates a third subset of the plurality of beams partially located within the first TA and the second TA with the first and/or second TAC.

In some embodiments, the transceiver, in operation, receives a position indicator indicating a position of the transceiver device; the circuitry, in operation, determines at least one of the plurality of beams using the position of the transceiver device, and controls the transceiver to transmit a paging message using the at least one of the plurality of beams determined by the circuitry.

For instance, the transceiver may be controlled to transmit the paging message using only the at least one of the plurality of beams.

In some embodiments, the transceiver, in operation, broadcasts a soft combining indicator indicating whether or not all of the plurality of beams are associated with an identical TAC.

Further provided is a method, the method comprising: serving a cell associated with a tracking area code, TAC; periodically transmitting, in system information, a TAC indicator indicating at least one TAC associated with the cell; and transmitting a trigger indicator for triggering a transceiver device to perform a system information update procedure when a content of the system information changes, wherein the system information is prevented from being transmitted in a case where the cell is partially within a first tracking area and a second tracking area.

In some embodiments, the second TAC is different from the first TAC.

In some embodiments, the first TAC is associated with a first tracking area, TA; and the second TAC is associated with a second TA, wherein the first TA and the second TA are stationary.

In some embodiments, the method comprises: receiving a location indicator indicating a location of the transceiver device; transmitting a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA.

In some embodiments, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In some embodiments, the method comprises: receiving a paging request to page a transceiver device registered to the first TA, when the cell is within the first TA; receiving a paging request to page a transceiver device registered to the second TA, when the cell is within the second TA; receives a paging request to page a transceiver device registered to either the first TA or the second TA, when the cell is partially within the first TA and the second TA, and transmitting a paging message according to the received paging request.

In some embodiments, the method comprises: serving the cell using a plurality of beams; associating a first subset of the plurality of beams located within the first TA with the first TAC; associating a second subset of the plurality of beams located within the second TA with the second TA; and associating a third subset of the plurality of beams partially located within the first TA and the second TA with the first and/or second TAC.

In some embodiments, the method comprises: receiving a position indicator indicating a position of the transceiver device; determining at least one of the plurality of beams using the position of the transceiver device, and transmitting a paging message using the at least one of the determined plurality of beams.

For instance, the paging message may be transmitted using only the at least one of the plurality of beams.

In some embodiments, the method comprises: broadcasting a soft combining indicator indicating whether or not all of the plurality of beams are associated with an identical TAC.

Further provided is a base station, comprising a transceiver; and circuitry which, in operation, controls the transceiver to serve a cell associated with a tracking area code, TAC, using a plurality of beams, and to periodically transmit, in system information, a TAC indicator indicating at least one TAC associated with the cell, wherein the circuitry, in operation, associates a first subset of the plurality of beams located within a first tracking area, TA, with a first TAC, associates a second subset of the plurality of beams located within a second TA with a second TAC, and associates a third subset of the plurality of beams partially located within the first TA and the second TA with the first TAC or the second TAC, wherein the circuitry, in operation, prevents the transceiver from transmitting the system information using the third subset of beams.

In some embodiments, the circuitry, in operation, controls the transceiver to transmit a trigger indicator for triggering a transceiver device to perform a system information update procedure when a content of the system information changes In some embodiments, the base station is configured to operate on a satellite.

For instance, the base station may be configured to operate on a satellite in low-earth orbit, LEO.

In some embodiments, the second TAC is different from the first TAC.

In some embodiments, the first TA and the second TA are stationary.

In some embodiments, the transceiver, in operation, receives a location indicator indicating a location of the transceiver device; and the circuitry, in operation, controls the transceiver to transmit a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA.

In some embodiments, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In some embodiments, the transceiver, in operation, receives a paging request to page a transceiver device registered to the first TA, when the cell is within the first TA, receives a paging request to page a transceiver device registered to the second TA, when the cell is within the second TA, receives a paging request to page a transceiver device registered to either the first TA or the second TA, when the cell is partially within the first TA and the second TA, and transmits a paging message according to the received paging request.

In some embodiments, the transceiver, in operation, receives a position indicator indicating a position of the transceiver device; the circuitry, in operation, determines at least one of the plurality of beams using the position of the transceiver device, and controls the transceiver to transmit a paging message using the at least one of the plurality of beams determined by the circuitry.

For instance, the transceiver may be controlled to transmit the paging message using only the at least one of the plurality of beams.

In some embodiments, the transceiver, in operation, broadcasts a soft combining indicator indicating whether or not all of the plurality of beams are associated with an identical TAC.

Further provided is a method, comprising: serving a cell associated with a tracking area code, TAC, using a plurality of beams; periodically transmitting, in system information, a TAC indicator indicating at least one TAC associated with the cell, associating a first subset of the plurality of beams located within a first tracking area, TA, with a first TAC, associating a second subset of the plurality of beams located within a second TA with a second TAC, and associating a third subset of the plurality of beams partially located within the first TA and the second TA with the first TAC or the second TAC; and preventing the transmission of the system information using the third subset of beams.

In some embodiments, the base station is configured to operate on a satellite.

For instance, the base station may be configured to operate on a satellite in low-earth orbit, LEO.

In some embodiments, the method comprises: transmitting a trigger indicator for triggering a transceiver device to perform a system information update procedure when a content of the system information changes.

In some embodiments, the second TAC is different from the first TAC.

In some embodiments, the first TA and the second TA are stationary.

In some embodiments, the method comprises: receiving a location indicator indicating a location of a transceiver device; and transmitting a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA.

In some embodiments, the first TAC is associated with the cell in a case where the cell is within the first TA; the second TAC is associated with the cell in a case where the cell is within the second TA; and the first TAC and/or the second TAC is associated with the cell in a case where the cell is partially within the first TA and the second TA.

In some embodiments, the method comprises: receiving a paging request to page a transceiver device registered to the first TA, when the cell is within the first TA; receiving a paging request to page a transceiver device registered to the second TA, when the cell is within the second TA; receiving a paging request to page a transceiver device registered to either the first TA or the second TA, when the cell is partially within the first TA and the second TA; and transmitting a paging message according to the received paging request.

In some embodiments, the method comprises: receiving a position indicator indicating a position of the transceiver device; determining at least one of the plurality of beams using the position of the transceiver device; and transmitting a paging message using the at least one of the plurality of beams.

For instance, the paging message may be transmitted using only the at least one of the plurality of beams.

In some embodiments, the method comprises: broadcasting a soft combining indicator indicating whether or not all of the plurality of beams are associated with an identical TAC.

Further provided is a base station, comprising a transceiver which, in operation, receives a position indicator indicating a position of a transceiver device; and circuitry which, in operation, controls the transceiver to serve a cell using a plurality of beams, to determine at least one of the plurality of beams using the position of the transceiver device, and to control the transceiver to transmit a paging message using the at least one of the plurality of beams determined by the circuitry.

In some embodiments, the base station is configured to operate on a satellite.

For instance, the base station may be configured to operate on a satellite in low-earth orbit, LEO.

For instance, the transceiver may be controlled to transmit the paging message using only the at least one of the plurality of beams.

Further provided is a method, comprising: serving a cell using a plurality of beams; receiving a position indicator indicating a position of a transceiver device; determining at least one of the plurality of beams using the position of the transceiver device; and transmitting a paging message using the determined at least one of the plurality of beams.

For instance, the paging message may be transmitted using only the determined at least one of the plurality of beams.

Further provided is a transceiver device, comprising circuitry which, in operation, controls a transceiver to transmit a position indicator indicating a position of the transceiver device; and the transceiver which, in operation, receives a paging message using at least one of a plurality of beams of a serving cell, depending on the position of the transceiver device.

Further provided is an access and mobility managing device, comprising a transceiver which, in operation, receives a location indicator indicating a location of a transceiver device; and circuitry which, in operation, determines whether or not the location is within a threshold distance from a boundary between a first tracking area, TA, and a second TA, to register the transceiver device with both the first TA and the second TA in a case where the location is within the threshold distance from the boundary, and to control the transceiver to transmit a TAC indicator indicating a first tracking area code, TAC, and a second TAC during a procedure when the transceiver device is registered to a network.

For instance, the TAC indicator may be transmitted to a base station.

In an embodiment, during a paging procedure to reach a transceiver device, the circuitry, in operation, controls the transceiver to transmit a paging request message to a base station covering either the first TA or the second TA.

In an embodiment, the circuitry, in operation, causes the transceiver to transmit a paging request to page a transceiver device registered to the first TA, when the cell is within the first TA, to transmit a paging request to page a transceiver device registered to the second TA, when the cell is within the second TA, and to transmit a paging request to page a transceiver device registered to either the first TA or the second TA, when the cell is partially within the first TA and the second TA.

Further provided is a method, comprising: receiving a location indicator indicating a location of a transceiver device; determining whether or not the location is within a threshold distance from a boundary between a first tracking area, TA, and a second TA; registering the transceiver device with both the first TA and the second TA in a case where the location is within the threshold distance from the boundary, and transmitting a TAC indicator indicating a first tracking area code, TAC, and a second TAC during a procedure when the transceiver device is registered to a network.

For instance, the TAC indicator may be transmitted to a base station.

In an embodiment, during a paging procedure to reach a transceiver device, the method comprises: transmitting a paging request message to a base station covering either the first TA or the second TA.

In an embodiment, the method comprises: transmitting a paging request to page a transceiver device registered to the first TA, when the cell is within the first TA, transmitting a paging request to page a transceiver device registered to the second TA, when the cell is within the second TA, and transmitting a paging request to page a transceiver device registered to either the first TA or the second TA, when the cell is partially within the first TA and the second TA.

Further provided is a network system, comprising: a transceiver device according to any one of above embodiments; and a base station according to any one of the above embodiments.

Further provided is a network system, comprising: a base station according to any one of above embodiments; and an access and mobility managing device according to any one of the above embodiments.

Further provided is a network system, comprising: a transceiver device according to any one of above embodiments; and an access and mobility managing device according to any one of the above embodiments.

Further provided is a network system, comprising: a transceiver device according to any one of above embodiments: a base station according to any one of above embodiments; and an access and mobility managing device according to any one of the above embodiments.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The invention claimed is:

1. A base station, comprising
a transceiver; and
circuitry, which, in operation, controls the transceiver to
serve a cell associated with a tracking area code (TAC), wherein a tracking area (TA) of the TAC corresponds to a fixed geographical area,
periodically transmit, in system information, multiple TACs per Public Land Mobile Network (PLMN), and
receive a location indicator indicating a location of a transceiver device from the transceiver device,
wherein, in response to the location of the transceiver device being indicated to the base station, the circuitry determines a TAC of the transceiver device out of the multiple TACs based on the indicated location of the transceiver device.

2. The base station according to claim 1, wherein
the cell is associated with a first TAC and a TAC indicator indicating at least one TAC associated with the cell,
the circuitry, in operation, controls the transceiver to transmit a trigger indicator for triggering the transceiver device to perform a system information update procedure when a content of the system information changes, and
the circuitry, in operation, prevents the transceiver from transmitting the trigger indicator in a case where the cell is being associated with a second TAC due to a movement of the cell.

3. The base station according to claim 2, wherein
the second TAC is different from the first TAC.

4. The base station according to claim 2, wherein
the first TAC is associated with a first tracking area (TA); and
the second TAC is associated with a second TA, wherein the first TA and the second TA are stationary.

5. The base station according to claim 4, wherein
when the transceiver receives the location indicator indicating the location of the transceiver device,
the circuitry, in operation, controls the transceiver to transmit a TAC indicator indicating the first TAC and the second TAC to the transceiver device during a procedure when the transceiver device is registered to a network, in a case where the transceiver device is registered with the first TA and the second TA due to the location being within a threshold distance from a boundary between the first TA and the second TA.

6. The base station according to claim 4, wherein the movement of the cell is a movement from the first TA to the second TA.

7. The base station according to claim 4, wherein
the first TAC is associated with the cell in a case where the cell is within the first TA;
the second TAC is associated with the cell in a case where the cell is within the second TA; and
the first TAC and/or the second TAC is associated with the cell in a case where the cell is partially within the first TA and the second TA.

8. The base station according to claim 4, wherein
the transceiver, in operation,
receives a paging request to page a transceiver device registered to the first TA, when the cell is within the first TA,
receives a paging request to page a transceiver device registered to the second TA, when the cell is within the second TA,
receives a paging request to page a transceiver device registered to either the first TA or the second TA, when the cell is partially within the first TA and the second TA, and transmits a paging message according to the received paging request.

9. The base station according to claim 4, wherein
the circuitry, in operation,
controls the transceiver to serve the cell using a plurality of beams,
associates a first subset of the plurality of beams located within the first TA with the first TAC,
associates a second subset of the plurality of beams located within the second TA with the second TAC, and
associates a third subset of the plurality of beams partially located within the first TA and the second TA with the first and/or second TAC.

10. The base station according to claim 9, wherein
the transceiver, in operation, receives a position indicator indicating a position of the transceiver device;
the circuitry, in operation,
determines at least one of the plurality of beams using the position of the transceiver device, and controls the transceiver to transmit a paging message using the at least one of the plurality of beams determined by the circuitry.

11. The base station according to claim 9, wherein the transceiver, in operation,
    broadcasts a first TAC indicator indicating the first TAC using the first subset of beams,
    broadcasts a second TAC indicator indicating the second TAC using the second subset of beams, and
    broadcasts a third TAC indicator indicating the first TAC and/or the second TAC using the third subset of beams.

12. The base station according to claim 9, wherein the transceiver, in operation, broadcasts a soft combining indicator indicating whether or not all of the plurality of beams are associated with an identical TAC.

13. The base station according to claim 9, wherein the transceiver, in operation, broadcasts a mapping indicator indicating a mapping between the plurality of beams and the first and/or second TAC associated therewith.

14. The base station according to claim 4, wherein
the first TAC is associated with the cell in a case where the cell is within in the first TA;
the second TAC is associated with the cell in a case where the cell is within in the second TA; and
the circuitry, in operation, turns off the transceiver or prevents the transceiver from transmitting a system information in a case where the cell is partially within the first TA and the second TA.

15. A transceiver device, comprising
a transceiver; and
circuitry, which, in operation, controls the transceiver to
    perform communication in a cell served by a base station associated with a tracking area code (TAC), wherein a tracking area (TA) of the TAC corresponds to a fixed geographical area,
    receive, in system information, multiple TACs per Public Land Mobile Network (PLMN), and
    transmit a location indicator indicating a location of the transceiver device to the base station,
    wherein, in response to the transceiver device indicating the location of the transceiver device to the base station, a TAC of the transceiver device is determined by the base station out of the multiple TACs based on the indicated location of the transceiver device.

16. A method performed by a base station, the method comprising:
    serving a cell associated with a tracking area code (TAC), wherein a tracking area (TA) of the TAC corresponds to a fixed geographical area,
    periodically transmitting, in system information, multiple TACs per Public Land Mobile Network (PLMN),
    receiving a location indicator indicating a location of a transceiver device from the transceiver device, and
    in response to the location of the transceiver device being indicated to the base station, determining a TAC of the transceiver device out of the multiple TACs based on the indicated location of the transceiver device.

17. A method performed by a transceiver device, the method comprising:
    performing communication in a cell served by a base station associated with a tracking area code (TAC), wherein a tracking area (TA) of the TAC corresponds to a fixed geographical area,
    receiving, in system information, multiple TACs per Public Land Mobile Network (PLMN), and
    transmitting a location indicator indicating a location of the transceiver device to the base station,
    wherein, in response to the transceiver device indicating the location of the transceiver device to the base station, a TAC of the transceiver device is determined by the base station out of the multiple TACs based on the indicated location of the transceiver device.

* * * * *